(12) United States Patent
Kashiwagi et al.

(10) Patent No.: US 9,137,539 B2
(45) Date of Patent: Sep. 15, 2015

(54) IMAGE CODING APPARATUS, IMAGE DECODING APPARATUS, IMAGE CODING METHOD, AND IMAGE DECODING METHOD

(75) Inventors: Yoshiichiro Kashiwagi, Kyoto (JP); Tao Chen, Palo Alto, CA (US)

(73) Assignee: Panasonic Corporation, Osaka (JP)

( * ) Notice: Subject to any disclaimer, the term of this patent is extended or adjusted under 35 U.S.C. 154(b) by 345 days.

(21) Appl. No.: 13/579,905

(22) PCT Filed: Dec. 21, 2011

(86) PCT No.: PCT/JP2011/007185
§ 371 (c)(1),
(2), (4) Date: Aug. 17, 2012

(87) PCT Pub. No.: WO2012/086203
PCT Pub. Date: Jun. 28, 2012

(65) Prior Publication Data
US 2012/0314965 A1    Dec. 13, 2012

Related U.S. Application Data

(60) Provisional application No. 61/426,419, filed on Dec. 22, 2010.

(51) Int. Cl.
*H04N 19/30* (2014.01)
*H04N 19/597* (2014.01)
*H04N 19/98* (2014.01)

(52) U.S. Cl.
CPC .............. *H04N 19/30* (2014.11); *H04N 19/597* (2014.11); *H04N 19/98* (2014.11)

(58) Field of Classification Search
CPC .............................. H04N 19/597; H04N 19/30

USPC ................. 382/232, 238; 375/240.01–240.26
See application file for complete search history.

(56) References Cited

U.S. PATENT DOCUMENTS 8,014,445 B2    9/2011    Segall et al.
8,175,158 B2    5/2012    Segall
(Continued)

FOREIGN PATENT DOCUMENTS

JP        11-313326        11/1999
JP        2007-243942       9/2007
(Continued)

OTHER PUBLICATIONS

Erdem, A. Tanju et al.; "Compression of 10-bit Video Using the Tools of MPEG-2", Signal Processing: Image Communication, vol. 7, Issue 1, Mar. 1995, pp. 27-56.
(Continued)

*Primary Examiner* — Behrooz Senfi

(57) ABSTRACT

An image coding apparatus to reduce data involved in coding a picture having a bit-depth higher than a bit-depth supported by an encoder, includes a down-converter which generates a base layer picture by down-converting a target picture to reduce the bit-depth of the target picture by a first value, a first encoder codes the base layer picture to generate a reconstructed picture by decoding the coded base layer picture, a subtractor performs shift amount adjustment on the reconstructed picture to increase the bit-depth of the reconstructed picture by a second value, and generates, based on the reconstructed picture on which the adjustment has been performed and the target picture, an enhancement layer picture for enhancing the quality of the base layer picture, a second encoder codes the enhancement layer picture; and an output unit outputs the coded base layer picture and the coded enhancement layer picture.

16 Claims, 32 Drawing Sheets

(56) References Cited

U.S. PATENT DOCUMENTS

| | | |
|---|---|---|
| 2005/0259729 A1 | 11/2005 | Sun |
| 2007/0201560 A1 | 8/2007 | Segall et al. |
| 2009/0097561 A1 | 4/2009 | Chiu et al. |
| 2009/0175338 A1 | 7/2009 | Segall |
| 2009/0219994 A1 | 9/2009 | Tu et al. |
| 2009/0238279 A1* | 9/2009 | Tu et al. ............ 375/240.16 |
| 2010/0046612 A1 | 2/2010 | Sun et al. |
| 2010/0226427 A1 | 9/2010 | Jung et al. |
| 2011/0012994 A1* | 1/2011 | Park et al. ............... 348/43 |
| 2011/0080948 A1* | 4/2011 | Chen et al. ............ 375/240.12 |
| 2011/0222605 A1 | 9/2011 | Kashiwagi et al. |

FOREIGN PATENT DOCUMENTS

| | | |
|---|---|---|
| JP | 2007-266750 | 10/2007 |
| JP | 2009-100472 | 5/2009 |
| WO | 2009/087952 | 7/2009 |
| WO | 2011/037933 | 3/2011 |

OTHER PUBLICATIONS

"Advanced Video Coding for Generic Audiovisual Services", ITU-T Recommendation H. 264, ISO/IEC 14496-10 (MPEG-4 AVC), Mar. 2010, 653 pages.

European Application No. 11850478.6 Extended European Search Report dated Jun. 3, 2015, 9 pages.

Winken, M. et al., "CE2: SVC bit-depth scalability", 24, JVT Meeting; 81. MPEG Meeting; Jun. 29, 2007-Jul. 5, 2007; Geneva, CH; (Joint Video Team of ISO/IEC JTC1/SC29/WG11 and ITU-T SG.16), No. JVT-X057, Jul. 4, 2007, XP030007164, ISSN: 000-0082, 15 pages.

* cited by examiner

FIG. 13

| 12-bit source video | Scene 1 | Scene 2 | Scene 3 | Scene 4 |
|---|---|---|---|---|
| 8-bit base layer video | No visible artifact due to bit truncation is observed | Severe visible artifact due to bit truncation is observed | A little visible artifact is observed | No visible artifact due to bit truncation is observed |
| Bit shift amount $b$ of base layer | $b = 0$ | $b = 4$ | $b = 2$ | $b = 0$ |

FIG. 23

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) | ex800

FIG. 34
| Corresponding standard | Driving frequency |
|---|---|
| MPEG-4 AVC | 500 MHz |
| MPEG-2 | 350 MHz |
| ⋮ | ⋮ |
FIG. 35A
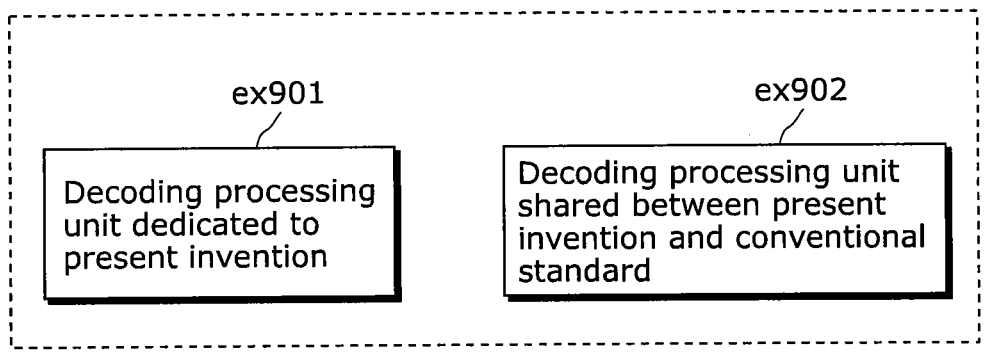
FIG. 35B
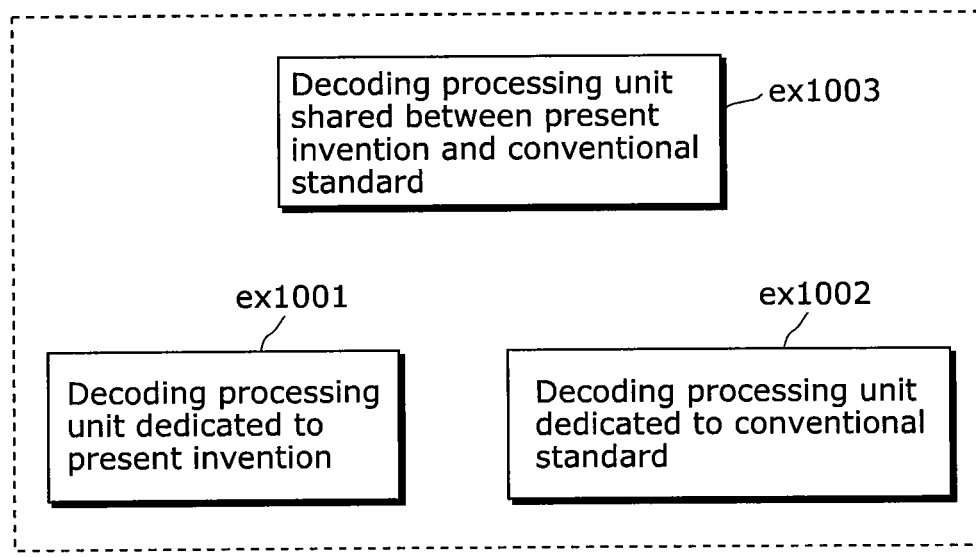

IMAGE CODING APPARATUS, IMAGE DECODING APPARATUS, IMAGE CODING METHOD, AND IMAGE DECODING METHOD

TECHNICAL FIELD

The present invention relates to image coding apparatuses and image decoding apparatuses. In particular, the present invention relates to a coding apparatus which codes a picture having a bit-depth higher than a predetermined bit-depth and a decoding apparatus which generates a picture having a bit-depth higher than a predetermined bit-depth.

BACKGROUND ART

Conventionally, image processing apparatuses such as display apparatuses, image capturing apparatuses, image coding apparatuses, and image decoding apparatuses process pictures per unit known as pixels. Each pixel has three individual sub-pixels, named green, red, and blue (RGB). Display apparatuses control the intensity of each sub-pixel to mix an overall color for that pixel. There are various levels of intensity of each sub-pixel. The level variation depends on the bit-depth.

A bit-depth indicates an information capacity per pixel, and is specifically the number of bits per sub-pixel. For instance, when the bit-depth is 8 bits, the intensity of each sub-pixel can be expressed in 256 (2 to the $8^{th}$ power) levels. When the bit-depth is 10 bits, the intensity of each sub-pixel can be expressed in 1024 (2 to the $10^{th}$ power) levels.

Furthermore, when the bit-depth is 8 bits, the number of combinations of the intensity levels of three sub-pixels within a single pixel is 256 to the power of 3 (16,777,216). When the bit-depth is 10 bits, the number of combinations of the intensity levels of three sub-pixels within a single pixel is 1024 to the power of 3 (1,073,741,824). This means that when the bit-depth is 10 bits, the number of reproducible colors is 64 times greater than that for the bit-depth of 8 bits.

In recent years, professional display apparatuses can display a picture having a bit-depth of 12 bits or 16 bits. Even consumer display apparatuses can display a picture having a bit-depth higher than 8 bits in some cases.

Display apparatuses capable of reproducing a larger number of colors enable smoother transitions from color to color and display of more lifelike colors. That is to say, a higher bit-depth enables smoother transitions from color to color and display of more lifelike colors. Therefore, rather than display of pictures having a bit-depth of 8 bits, consumers prefer display of pictures having a higher bit-depth.

Note that a picture displayed with a bit-depth of 8 bits is called an 8-bit picture. Likewise, a picture displayed with a bit-depth of 10 bits is called a 10-bit picture. That is to say, a picture displayed with a bit-depth of n bits is generally referred to as an n-bit picture.

Here, in order to output a picture having a higher bit-depth, a plurality of massively available 8-bit video processors may be used.

CITATION LIST

Non Patent Literature

[NPL 1]
ITU-T and ISO/IEC JTC 1, "Advanced video coding for generic audiovisual services," ITU-T Recommendation H.264 and ISO/IEC 14496-10 (MPEG-4 AVC), 2010.

SUMMARY OF INVENTION

Technical Problem

Conventional techniques however have a problem that coding causes an increase in the amount of data.

For example, when one 10-bit picture is processed by each of two 8-bit video processors, it is necessary to transmit an amount of data greater than the amount of data of the 10-bit picture which is the original target to be transmitted. This results in an increase in the recording capacity of a recording medium required for recording the picture or an increase in the bandwidth required for transmitting the picture via a network.

In view of this, it is an object of the present invention to provide an image coding apparatus and others which reduce the amount of data involved in coding which is performed, using an encoder having a restriction on bit-depth, on a picture having a bit-depth higher than a bit-depth supported by the encoder.

Solution to Problem

In order to solve the above problems, an image coding apparatus according to an aspect of the present invention is an image coding apparatus which codes a target picture having a bit-depth higher than a predetermined bit-depth, the bit-depth indicating an information capacity per pixel, the image coding apparatus including: a down-converter which generates a base layer picture by performing down-conversion on the target picture to reduce the bit-depth of the target picture by a first value so that the bit-depth of the target picture equals the predetermined bit-depth; a first encoder which codes the base layer picture, and generates a reconstructed picture by decoding the coded base layer picture; a subtractor which performs shift amount adjustment on the reconstructed picture to increase a bit-depth of the reconstructed picture by a second value, and generates, based on the reconstructed picture on which the shift amount adjustment has been performed and the target picture, an enhancement layer picture which is a picture for enhancing a quality of the base layer picture and has a same bit-depth as a bit-depth of the base layer picture; a second encoder which codes the enhancement layer picture; and an output unit configured to output the coded base layer picture and the coded enhancement layer picture.

According to this, the image coding apparatus includes, in the enhancement layer picture that is different from the base layer picture, the number of bits which are included in the bit-depth of the target picture and correspond to the second value. As a result, in the following decoding processing, it is possible to increase the image quality of the base layer picture using the enhancement layer picture. That is to say, the image coding apparatus can adjust, using the second value, the amount of bits to be transmitted as the enhancement layer picture to be generated. Therefore, by optimizing, using the second value, the amount of bits to be transmitted as the enhancement layer picture, the image coding apparatus can reduce the amount of data involved in coding performed, using an encoder having a restriction on bit-depth, on a picture having a bit-depth higher than a bit-depth supported by the encoder.

More specifically, the subtractor may (i) subtract, from each of pixel values of pixels included in a picture having a bit-depth obtained by reducing the bit-depth of the target picture by a third value, a pixel value of a corresponding one of pixels included in the reconstructed picture on which the shift amount adjustment has been performed, and (ii) generate the enhancement layer picture using, out of bit information indicating a result of the subtraction, bit information included in a range of the predetermined bit-depth from a lower bit, the third value being a difference between the first value and the second value.

According to this, the subtractor included in the image coding apparatus can generate the enhancement layer picture by shifting the bit sequence of pixels by the third value having the first value as the upper limit.

Furthermore, the subtractor may include a shift amount determining unit configured to determine the second value based on characteristics of the base layer picture, the target picture, or the reconstructed picture, and the output unit may be further configured to output a value corresponding to the second value determined by the shift amount determining unit.

According to this, the image coding apparatus can appropriately determine the second value according to the characteristics of a picture signal to be coded. As a result, it is possible to solve a trade-off between the image quality and the data size at the time of picture down-conversion, and reduce the data size while suppressing deterioration in image quality.

More specifically, the shift amount determining unit may be configured to determine the second value such that the second value increases when low frequency components among spatial-frequency components of the target picture or the base layer picture are visually more dominant.

According to this, it is possible to determine an appropriate second value based on the findings that deterioration in image quality caused by the down-conversion is more noticeable when the low frequency components among the spatial-frequency components of a picture are visually more dominant.

Note that the output unit may be further configured as a multiplexer which generates a bitstream conforming to a multiview video coding (MVC) standard, by multiplexing a base layer bitstream which includes the coded base layer picture and an enhancement layer bitstream which includes the coded enhancement layer picture, the first encoder, the second encoder, and the multiplexer may be configured as an MVC encoder, and the multiplexer may add a value corresponding to the second value to the bitstream conforming to the MVC standard, the value corresponding to the second value being determined for a plurality of target pictures including the target picture.

According to this, the image coding apparatus can be implemented using an existing MVC encoder, an existing MVC decoder, and a bitstream having an MVC structure.

Note that the down-converter may generate the base layer picture by performing the down-conversion to shift down, by the first value, a bit sequence of each of pixel values of pixels included in the target picture, and the subtractor may (i) shift up, by the second value, a bit sequence of each of pixel values of pixels included in the reconstructed picture, (ii) shift down, by a difference between the first value and the second value, the bit sequence of each of the pixel values of the pixels included in the target picture, and (iii) generate the enhancement layer picture from a difference between each of the shifted-down pixel values of the pixels included in the target picture and the shifted-up pixel value of a corresponding one of the pixels included in the reconstructed picture.

Furthermore, the down-converter may generate the base layer picture by performing the down-conversion to divide, by a predetermined divisor, each of pixel values of pixels included in the target picture so that the bit-depth of the target picture is reduced by the first value, and the subtractor may (i) multiply, by a predetermined multiplier, each of pixel values of pixels included in the reconstructed picture so that the bit-depth of the reconstructed picture increases by the second value, (ii) divide, by a predetermined divisor, each of the pixel values of the pixels included in the target picture so that the bit-depth of the target picture is reduced by a difference between the first value and the second value, and (iii) generate the enhancement layer picture from a difference between each of the pixel values, which is obtained from the division, of the pixels included in the target picture and the pixel value, which is obtained from the multiplication, of a corresponding one of the pixels included in the reconstructed picture.

Furthermore, the subtractor may add a predetermined value to a value obtained by subtracting, from each of pixel values of pixels included in the target picture having the bit-depth reduced by the third value, a pixel value of a corresponding one of the pixels included in the reconstructed picture on which the shift amount adjustment has been performed, the predetermined value being a value that makes each of pixel values of pixels included in the enhancement layer picture a positive value.

According to this, even when a pixel value for an enhancement layer is calculated as a negative value as a result of the bit operation, the image coding apparatus can ensure to unfailingly output a positive value as the pixel value.

An image decoding apparatus according to an aspect of the present invention is an image decoding apparatus which decodes a picture from a bitstream to generate a target picture having a bit-depth higher than a predetermined bit-depth by a first value, the bit-depth indicating an information capacity per pixel, the image decoding apparatus including: a first decoder which decodes from the bitstream a base layer picture having a bit-depth equal to the predetermined bit-depth; a second decoder which decodes from the bitstream an enhancement layer picture having a bit-depth equal to the predetermined bit-depth; and an adder which generates the target picture by adding up the base layer picture and the enhancement layer picture based on a second value obtained from the bitstream.

According to this, the image decoding apparatus obtains, from the bitstream, the second value determined by the image coding apparatus as the amount of bits to be transmitted as the enhancement layer picture. After that, using the second value obtained for each picture, the image decoding apparatus can improve the quality of the decoded base layer picture using the enhancement layer picture.

More specifically, the adder may generate the target picture by (i) performing up-conversion on the base layer picture to increase the bit-depth of the base layer picture by the second value, (ii) generating a synthesized picture of the base layer picture on which the up-conversion has been performed and the enhancement layer picture, by adding up each of pixel values of pixels of the base layer picture and a pixel value of a corresponding one of pixels of the enhancement layer picture, and (iii) increasing a bit-depth of the synthesized picture by a third value that is a difference between the first value and the second value.

According to this, the adder included in the image decoding apparatus can perform, on the decoded base layer picture and the decoded enhancement layer picture, a bit operation corresponding to a bit operation performed on each pixel at the time of coding.

Furthermore, the bitstream may be a bitstream conforming to a multiview video coding (MVC) standard, the image decoding apparatus may further include a multiplexer which generates a picture sequence by multiplexing the decoded base layer picture and the decoded enhancement layer picture, the first decoder, the second decoder, and the multiplexer may be configured as an MVC decoder, and the adder may obtain the second value from the bitstream conforming to the MVC standard.

According to this, the image decoding apparatus can be implemented using an existing MVC encoder, an existing MVC decoder, and a bitstream having an MVC structure.

Note that the adder may generate the target picture by (i) shifting up, by the second value, a bit sequence of each of the pixel values of the pixels included in the base layer picture, and (ii) shifting up, by the third value, a bit sequence of each of pixel values of pixels included in the synthesized picture.

Furthermore, the adder may generate the target picture by (i) multiplying, by a predetermined multiplier, each of the pixel values of the pixels included in the base layer picture so that the bit-depth of the base layer picture increases by the second value, and (ii) multiplying, by a predetermined multiplier, each of pixel values of pixels included in the synthesized picture so that the bit-depth of the synthesized picture increases by the third value.

Furthermore, before adding the base layer picture and the enhancement layer picture, the adder may subtract, from each of pixel values of pixels included in the enhancement layer picture, a predetermined value added at a time of coding.

Note that the present invention can be implemented not only as such an image coding apparatus and an image decoding apparatus, but also as: an image coding method and an image decoding method which include, as steps, characteristic elements included in the image coding apparatus and the image decoding apparatus; and programs which cause a computer to execute such characteristic steps. Needless to say, such programs can be distributed via a recording medium such as a Compact Disc Read Only Memory (CD-ROM) or a transmission medium such as the Internet.

Furthermore, the present invention can be implemented as: a semiconductor integrated circuit (LSI) which implements part of all of the functions of such an image coding apparatus and an image decoding apparatus; and a video system which includes such an image coding apparatus and an image decoding apparatus.

Advantageous Effects of Invention

The present invention provides an image coding apparatus which reduces the amount of data involved in coding which is performed, using an encoder having a restriction on bit-depth, on a picture having a bit-depth higher than a bit-depth supported by the encoder.

BRIEF DESCRIPTION OF DRAWINGS

FIG. 13 shows an example of a result of determination of a value b by a shift amount determining unit according to the characteristics of a base layer picture.

FIG. 23 illustrates a structure of multiplexed data.

FIG. 34 shows an example of a look-up table in which video data standards are associated with driving frequencies.

FIG. 35A is a diagram showing an example of a configuration for sharing a module of a signal processing unit.

FIG. 35B is a diagram showing another example of a configuration for sharing a module of the signal processing unit.

DESCRIPTION OF EMBODIMENTS

Hereinafter, embodiments of the present invention will be described in detail with accompanying drawings. Note that each of the embodiments described below is a preferable specific example of the present invention. The numerical values, shapes, structural elements, the arrangement and connection of the structural elements, steps, the processing order of the steps etc. shown in the following embodiments are mere examples, and therefore do not limit the present invention. The present invention is limited only by the claims. Therefore, among the structural elements in the following embodiments, structural elements not recited in any of the independent claims indicating the most generic concept of the present invention are not essential for achieving the object of the present invention but are described as preferable structural elements.

First, to clarify the significance of the present invention, an image coding apparatus and an image decoding apparatus disclosed in PCT international publication No. 2011/037933, which teaches a technique related to the present invention, will be specifically described by reference to FIG. 1 to FIG. 8.

Figure 1:
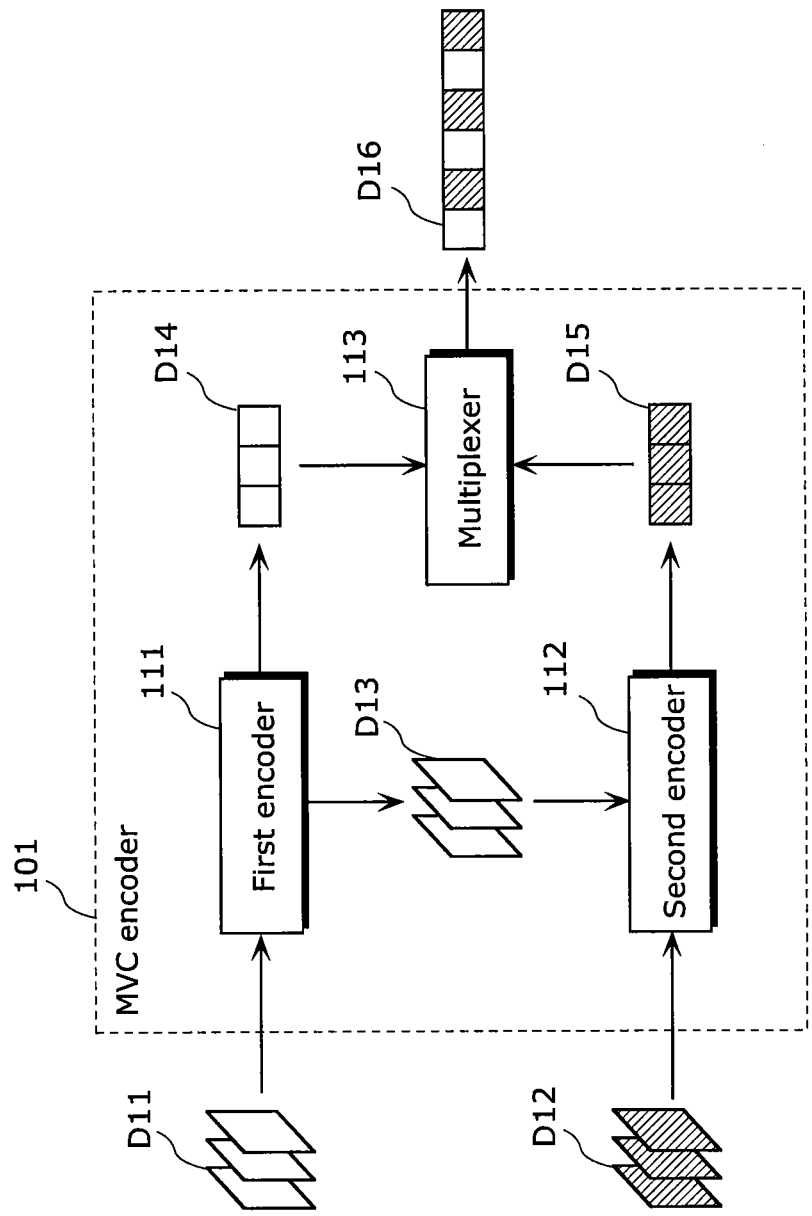
FIG. 1 is a configuration diagram of an MVC encoder according to a technique related to the present invention.

FIG. 1 is a configuration diagram of a typical MVC encoder. The MVC encoder is an encoder which codes multiview video based on a multiview video coding method.

In a multiview video coding (MVC) technique, one view is coded as a base view (see Non Patent Literature 1). Here, the base view is also called a first view. Another view is coded as a non-base view. The non-base view is also called a dependent view or a second view.

A bitstream of coded base views can be decoded independently. For example, the base view is used for displaying the 2D version of 3D video. On the other hand, a bitstream of coded non-base views cannot be decoded independently. The non-base view needs to be decoded together with the base view.

The non-base view is used for enhancing the base view. For example, synthesizing a base view corresponding to left-eye video and a non-base view corresponding to right-eye video allows display of stereoscopic 3D video.

An MVC encoder 101 shown in FIG. 1 includes a first encoder 111, a second encoder 112, and a multiplexer 113.

The first encoder 111 receives a base layer picture D11 which is a picture corresponding to the base view. The first encoder 111 codes the base layer picture D11 to generate a base view bitstream D14 which includes the coded base layer picture D11. The first encoder 111 decodes the coded base layer picture D11 to generate a reconstructed picture D13. The reconstructed picture D13 is used for inter-view prediction.

The second encoder 112 receives a non-base layer picture D12 which is a picture corresponding to the non-base view. The second encoder 112 codes the non-base layer picture D12 to generate a non-base view bitstream D15 which includes the coded non-base layer picture D12. At this time, the second encoder 112 may code the non-base layer picture D12 by referring to the reconstructed picture D13 using inter-view prediction. This increases the coding efficiency.

The multiplexer 113 multiplexes the base view bitstream D14 and the non-base view bitstream D15 to generate an MVC bitstream D16. Typically, the multiplexer 113 generates the MVC bitstream D16 such that the portions indicating the base views alternate with the portions indicating the non-base views.

In this manner, the MVC encoder 101 receives and codes the base layer picture D11 and the non-base layer picture D12 to generate the MVC bitstream D16. For example, the MVC encoder 101 can code, from a 3D picture, the base layer picture D11 which is a left-eye picture and the non-base layer picture D12 which is a right-eye picture, and output the coded 3D picture as the MVC bitstream D16.

Note that the MVC encoder 101 shown in FIG. 1 is one example. The MVC encoder 101 may include three or more encoders to code three or more views. Moreover, one encoder may code a plurality of views. Furthermore, the MVC encoder 101 may output the base view bitstream D14 and the non-base view bitstream D15 separately, without multiplexing. In this case, the MVC encoder 101 does not have to include the multiplexer 113.

Figure 2:
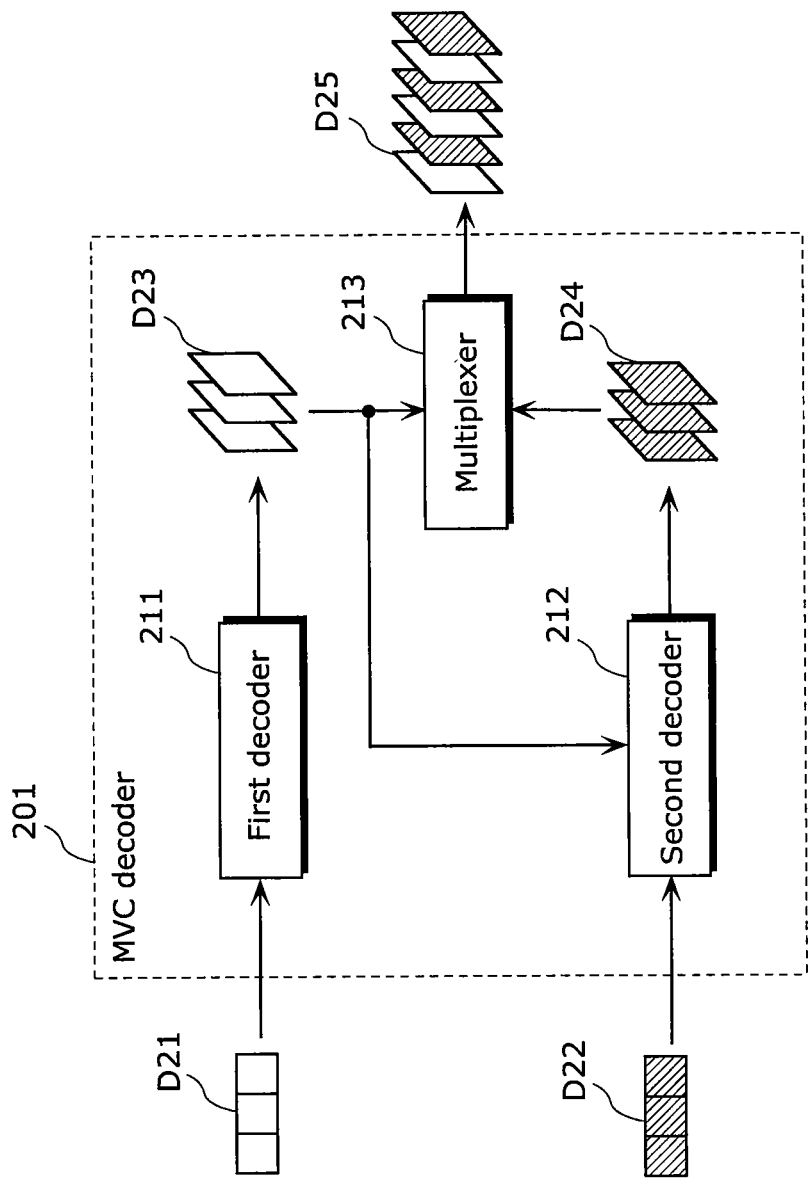
FIG. 2 is a configuration diagram of an MVC decoder according to a technique related to the present invention.

FIG. 2 is a configuration diagram of a typical MVC decoder. The MVC decoder is a decoder which decodes multiview video coded based on the multiview video coding method. An MVC decoder 201 shown in FIG. 2 includes a first decoder 211, a second decoder 212, and a multiplexer 213.

The first decoder 211 receives a base view bitstream D21. The first decoder 211 may read the base view portions from the MVC bitstream D16 shown in FIG. 1, as the base view bitstream D21. The first decoder 211 then decodes a base layer picture D23 from the base view bitstream D21. This means, the base layer picture D23 is the same as the reconstructed picture D13.

The second decoder 212 receives a non-base view bitstream D22. The second decoder 212 may read the non-base view portions from the MVC bitstream D16 shown in FIG. 1, as the non-base view bitstream D22. The second decoder 212 then decodes a non-base layer picture D24 from the non-base view bitstream D22. At this time, the second decoder 212 may decode the non-base layer picture D24 by referring to the base layer picture D23 using inter-view prediction.

The multiplexer 213 multiplexes the base layer picture D23 and the non-base layer picture D24 to generate a picture sequence D25. Typically, the multiplexer 213 generates the picture sequence D25 such that the portions indicating the base views alternate with the portions indicating the non-base views.

In this manner, the MVC decoder 201 receives the base view bitstream D21 and the non-base view bitstream D22, and decodes from these bitstreams the base layer picture D23 and the non-base layer picture D24 to generate the picture sequence D25.

For example, the MVC decoder 201 decodes, from the base view bitstream D21 corresponding to the left eye and the non-base view bitstream D22 corresponding to the right eye, the base layer picture D23 which is a left-eye picture and the non-base layer picture D24 which is a right-eye picture, respectively. The MVC decoder 201 then can output, as a 3D picture, the picture sequence D25 generated by combining the base layer picture D23 and the non-base layer picture D24.

Note that like the MVC encoder 101 shown in FIG. 1, the MVC decoder 201 shown in FIG. 2 is one example. The MVC decoder 201 may include three or more decoders to decode three or more views. Moreover, one decoder may decode a plurality of views. Furthermore, the MVC decoder 201 may output the base layer picture D23 and the non-base layer picture D24 separately, without multiplexing. In this case, the MVC decoder 201 does not have to include the multiplexer 213.

Moreover, the MVC decoder 201 may include a demultiplexer which demultiplexes the MVC bitstream D16 shown in FIG. 1 into the base view portions and the non-base view portions.

The MVC encoder 101 shown in FIG. 1 and the MVC decoder 201 shown in FIG. 2 are typical MVC encoder and MVC decoder, respectively. Thus, the MVC encoder 101 and the MVC decoder 201 cannot code or decode a picture having a bit-depth higher than 8 bits. In view of this, the image coding apparatus and the image decoding apparatus according to the technique related to the present invention include additional structural elements.

Figure 3:
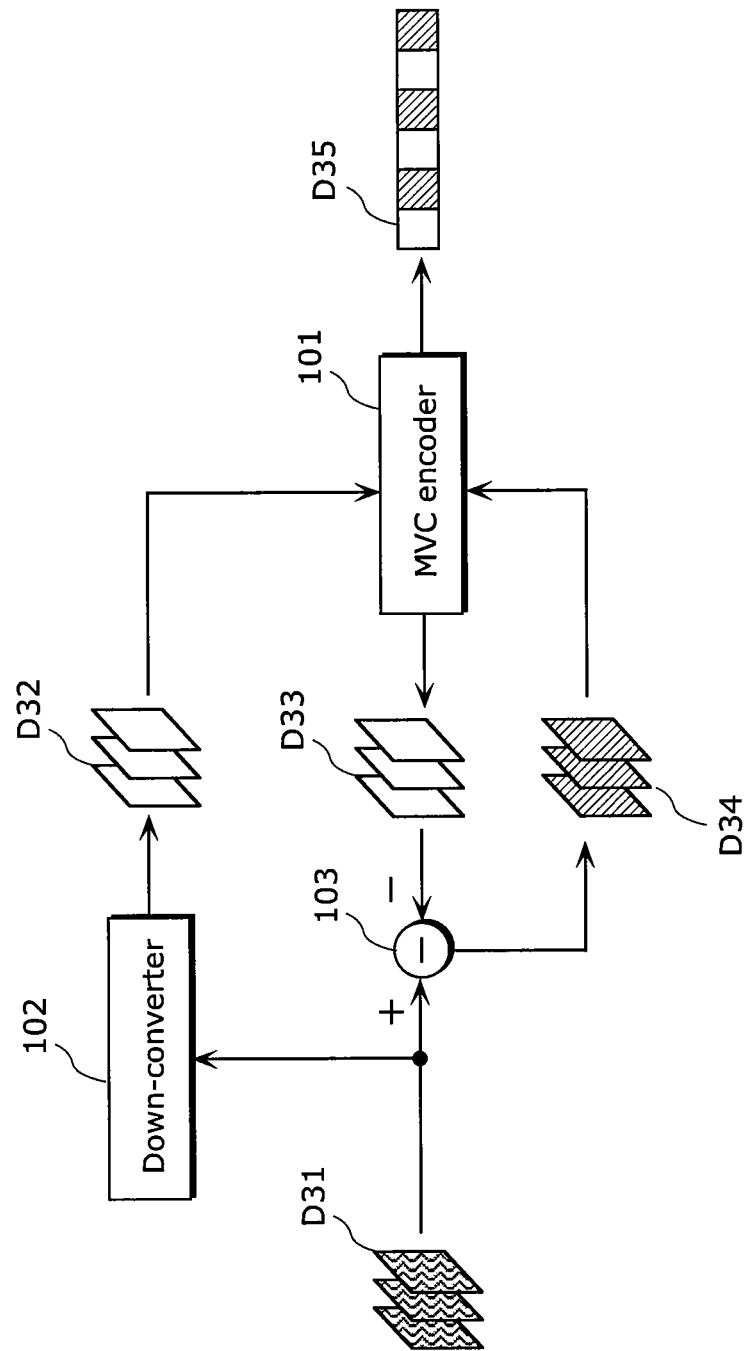
FIG. 3 is a configuration diagram of an image coding apparatus according to a technique related to the present invention.

FIG. 3 shows functional blocks of the image coding apparatus according to the technique related to the present invention. The image coding apparatus shown in FIG. 3 includes the MVC encoder 101 shown in FIG. 1, a down-converter 102, and a subtractor 103.

The down-converter 102 generates a base layer picture D32 which is an 8-bit picture, by down-converting a 10-bit picture D31 which is a target picture to be coded.

The MVC encoder 101 codes the base layer picture D32 as a base layer picture. The MVC encoder 101 then decodes the coded base layer picture D32 to generate a reconstructed picture D33 which is an 8-bit picture.

The subtractor 103 generates, from the difference between the characteristics of the 10-bit picture D31 and the characteristics of the reconstructed picture D33, an enhancement layer picture D34 which enhances the base layer picture D32 to a 10-bit picture. The characteristics of each picture to be used here are, for example, information indicating the magnitude of pixel values.

The MVC encoder 101 further codes the enhancement layer picture D34 as a non-base layer picture. The MVC encoder 101 then outputs the coded base layer picture D32 and the coded enhancement layer picture D34 as an MVC bitstream D35.

Figure 4:
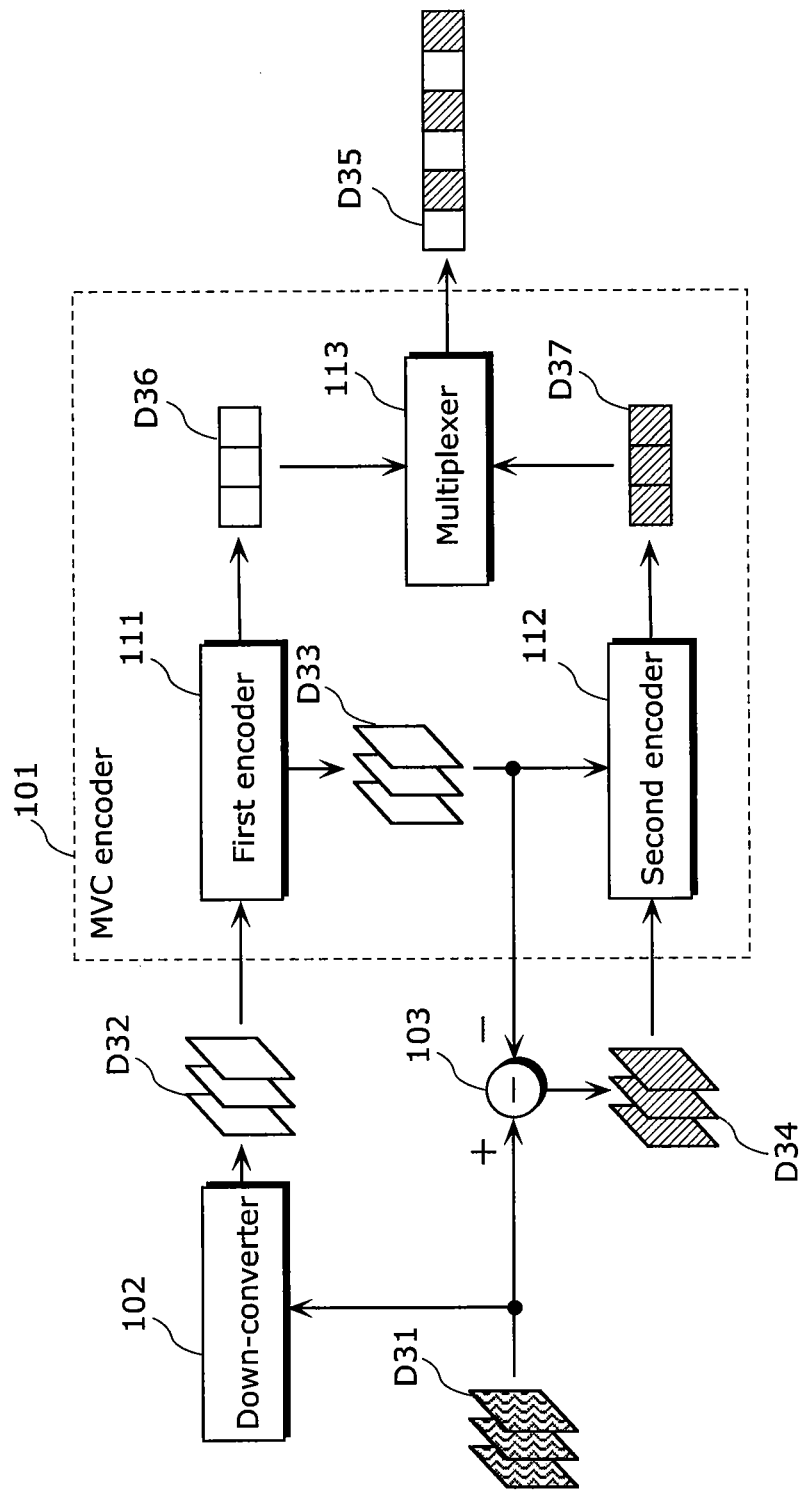
FIG. 4 shows a specific configuration of an image coding apparatus according to a technique related to the present invention.

FIG. 4 more specifically shows the image coding apparatus shown in FIG. 3. Hereinafter, the image coding apparatus according to the technique related to the present invention will be specifically described using FIG. 4.

The down-converter 102 down-converts the 10-bit picture D31 to generate the base layer picture D32 which is an 8-bit picture. More specifically, the down-converter 102 down-converts the 10-bit picture D31 through the operation shown in Equation 1.

$$B(x,y)=(S(x,y)+2)>>2;$$ (Equation 1)

Here, (x, y) indicates a pixel position. B(x, y) indicates a pixel value of the base layer picture D32. S(x, y) indicates a pixel value of the 10-bit picture D31. The symbol ">>" denotes a right shift operation.

More specifically, the down-converter 102 first adds 2 to each pixel value of the 10-bit picture D31. The down-converter 102 then shifts each pixel value to the right by 2 bits. With this, the low 2 bits of each pixel value are rounded off, and a base layer picture D32 having 8 bits is generated.

The first encoder 111 of the MVC encoder 101 codes the base layer picture D32 as a base layer picture to generate a base layer bitstream D36. The first encoder 111 then decodes the coded base layer picture D32 to generate the reconstructed picture D33.

The subtractor 103 generates the enhancement layer picture D34 from the difference between the 10-bit picture D31 and the reconstructed picture D33. More specifically, the subtractor 103 calculates the difference between the 10-bit picture D31 and the reconstructed picture D33 through the operation shown in Equation 2.

$$E(x,y)=S(x,y)-(Br(x,y)<<2)+128;$$ (Equation 2)

Here, (x, y) indicates a pixel position. E(x, y) indicates a pixel value of the enhancement layer picture D34. S(x, y) indicates a pixel value of the 10-bit picture D31. Br(x, y) indicates a pixel value of the reconstructed picture D33. The symbol "<<" denotes a left shift operation.

More specifically, the subtractor 103 first shifts each pixel value of the reconstructed picture D33 to the left by 2 bits. With this, the bit-depth of the reconstructed picture D33 is converted into 10 bits. Next, the subtractor 103 subtracts, from each pixel value of the 10-bit picture D31, a corresponding one of the pixel values of the reconstructed picture D33 which have been shifted to the left by 2 bits. The subtractor 103 then adds 128 to the result of the subtraction.

Here, the subtractor 103 adds 128 to the result of the subtraction, but the value to be added is not limited to 128. The subtractor 103 may add a value obtained by rounding off, to an integer, half a maximum pixel value represented by the bit-depth of the enhancement layer picture D34. Furthermore, the subtractor 103 may add a different value to the result of the subtraction to make each pixel value of the enhancement layer picture D34 a positive value.

Moreover, the subtractor 103 may clip E(x, y) to be within the range of the 8-bit picture, [0, 255]. In other words, the subtractor 103 may convert a pixel value smaller than 0 into 0, and convert a pixel value larger than 255 into 255.

For example, there is a case where the reconstructed picture D33 has quantization distortion which is assumed, based on the range of the pixel values of the 8-bit picture [0, 255], to be within the range [−32, 31] at the largest. The quantization distortion is within the range [−128, 127] even when each pixel value is quadrupled by the left shift operation, and the range of the value expressed as S(x, y)−(Br(x, y)<<2) is assumed to be within the range [−128, 127].

Thus, even when the subtractor 103 adds 128 to the above difference and then clips E(x, y) to be within the range of the 8-bit picture [0, 255], the influence from such addition and clipping is limited to an abnormal value. Accordingly, the subtractor 103 can remove or conceal only a fatal error by clipping E(x, y) to be within the range of the 8-bit picture, [0, 255].

The second encoder 112 of the MVC encoder 101 codes, as a non-base layer picture, the enhancement layer picture D34 generated by the subtractor 103. By doing so, the second encoder 112 generates an enhancement layer bitstream D37. At this time, the second encoder 112 may code the enhancement layer picture D34 by referring to the reconstructed picture D33 using inter-view prediction.

Note that there is a high possibility that there is almost no correlation between the reconstructed picture D33 and the enhancement layer picture D34. However, use of inter-view prediction is not restricted, and the second encoder 112 may code the enhancement layer picture D34 using inter-view prediction.

Then, the multiplexer 113 of the MVC encoder 101 multiplexes the base layer bitstream D36 and the enhancement layer bitstream D37 to generate the MVC bitstream D35.

Figure 5:
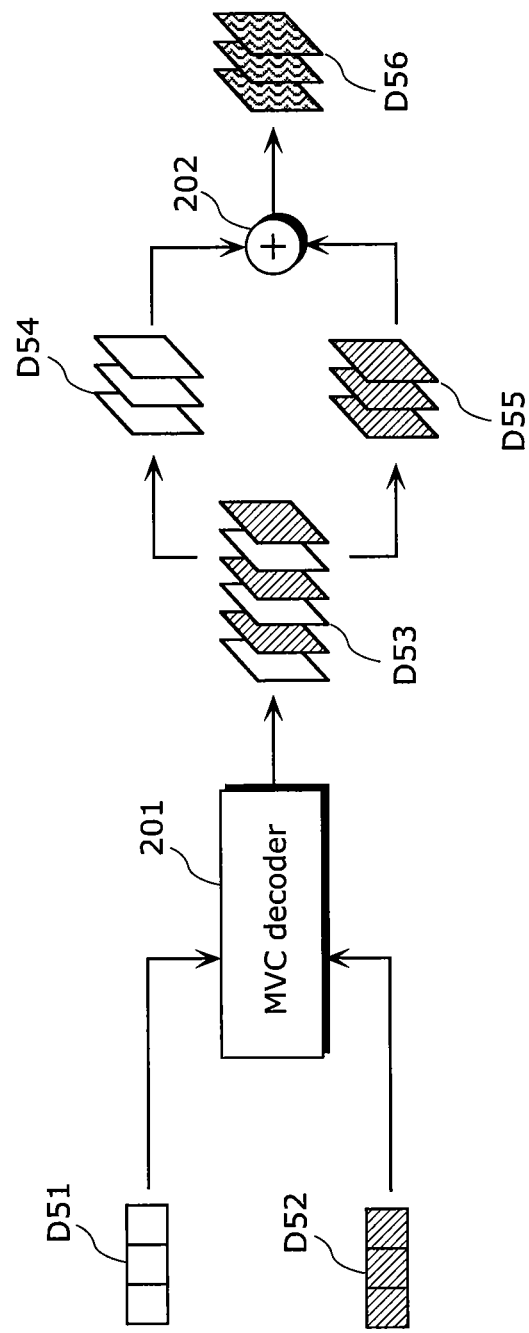
FIG. 5 is a configuration diagram of an image decoding apparatus according to a technique related to the present invention.

FIG. 5 is a configuration diagram of an image decoding apparatus including the MVC decoder 201 shown in FIG. 2. The image decoding apparatus shown in FIG. 5 includes the MVC decoder 201 and an adder 202.

The MVC decoder 201 decodes a base layer picture from a base layer bitstream D51. The MVC decoder 201 also decodes an enhancement layer picture from an enhancement layer bitstream D52. The MVC decoder 201 then generates a picture sequence D53.

The adder 202 synthesizes a base layer picture D54 and an enhancement layer picture D55 which are included in the picture sequence D53, to generate a 10-bit picture D56 which is a target picture to be decoded.

Figure 6:
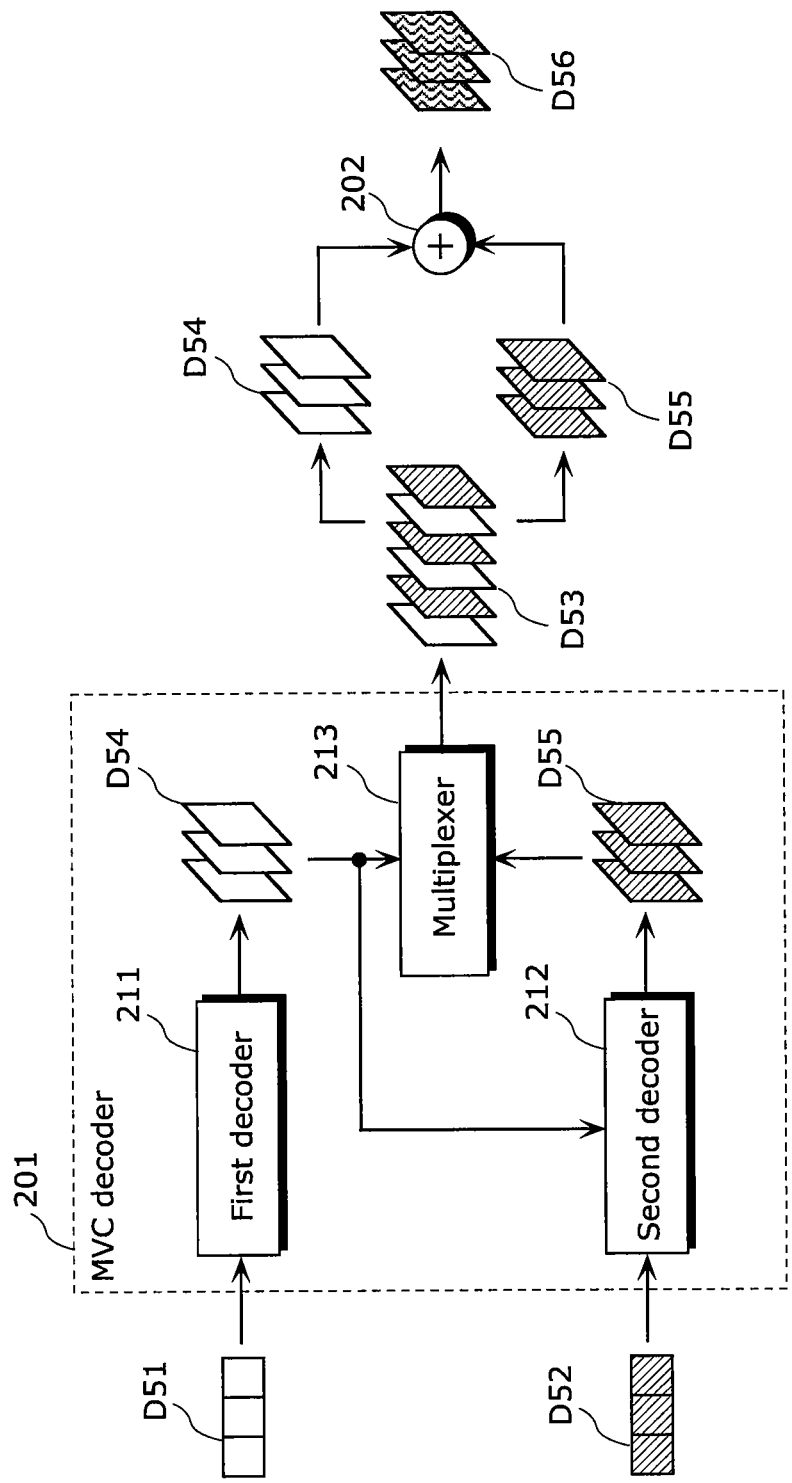
FIG. 6 shows a specific configuration of an image decoding apparatus according to a technique related to the present invention.

FIG. 6 more specifically shows the image decoding apparatus shown in FIG. 5. Hereinafter, the image decoding apparatus according to the technique related to the present invention will be specifically described using FIG. 6.

The first decoder 211 of the MVC decoder 201 decodes the base layer picture D54 from the base layer bitstream D51.

The second decoder 212 of the MVC decoder 201 decodes the enhancement layer picture D55 from the enhancement layer bitstream D52. At this time, the second decoder 212 may decode the enhancement layer picture D55 by referring to the base layer picture D54 using inter-view prediction.

The multiplexer 213 of the MVC decoder 201 generates the picture sequence D53 from the base layer picture D54 and the enhancement layer picture D55.

The adder 202 generates the 10-bit picture D56 by synthesizing the base layer picture D54 and the enhancement layer picture D55 which are included in the picture sequence D53. More specifically, the adder 202 synthesizes the base layer picture D54 and the enhancement layer picture D55 through the operation shown in Equation 3.

$$V(x,y)=(Br(x,y)<<2)+(E(x,y)-128);\quad\text{(Equation 3)}$$

Here, (x, y) indicates a pixel position. V(x, y) indicates a pixel value of the 10-bit picture D56. Br(x, y) indicates a pixel value of the base layer picture D54. E(x, y) indicates a pixel value of the enhancement layer picture D55. The symbol "<<" denotes a left shift operation.

More specifically, the adder 202 first shifts each pixel value of the base layer picture D54 to the left by 2 bits. With this, the bit-depth of the base layer picture D54 is converted into 10 bits. Next, the adder 202 subtracts 128 from each pixel value of the enhancement layer picture D55. Next, the adder 202 adds the pixel values of the enhancement layer picture D55, from which 128 has been subtracted, to the pixel values of the base layer picture D54 having the bit-depth converted into 10 bits.

Here, the adder 202 subtracts 128 from each pixel value, but the value to be subtracted is not limited to 128. The adder 202 may subtract a value obtained by rounding off, to an integer, half a maximum pixel value represented by the bit-depth of the enhancement layer picture D55. Furthermore, the adder 202 may subtract, from each pixel value, a value which has been added at the time of coding.

Moreover, the adder 202 clips V(x, y) to be within a range permitted as a 10-bit picture. For example, the adder 202 clips V(x, y) through the operations shown in Equation 4 and Equation 5.

$$V(x,y)=(V(x,y)>maxV10)?maxV10:V(x,y);\quad\text{(Equation 4)}$$

$$V(x,y)=(V(x,y)<minV10)?minV10:V(x,y);\quad\text{(Equation 5)}$$

Here, V=A?B:C; means that the value of V is set to B when the condition A is satisfied, and otherwise, the value of V is set to C. Furthermore, maxV10 and minV10 respectively are a maximum value and a minimum value permitted as a 10-bit picture. Typically, maxV10 is 1023 and minV10 is 0. However, maxV10 and minV10 may be set with other values.

The adder 202 performs the above processing to generate the 10-bit picture D56.

Figure 7:
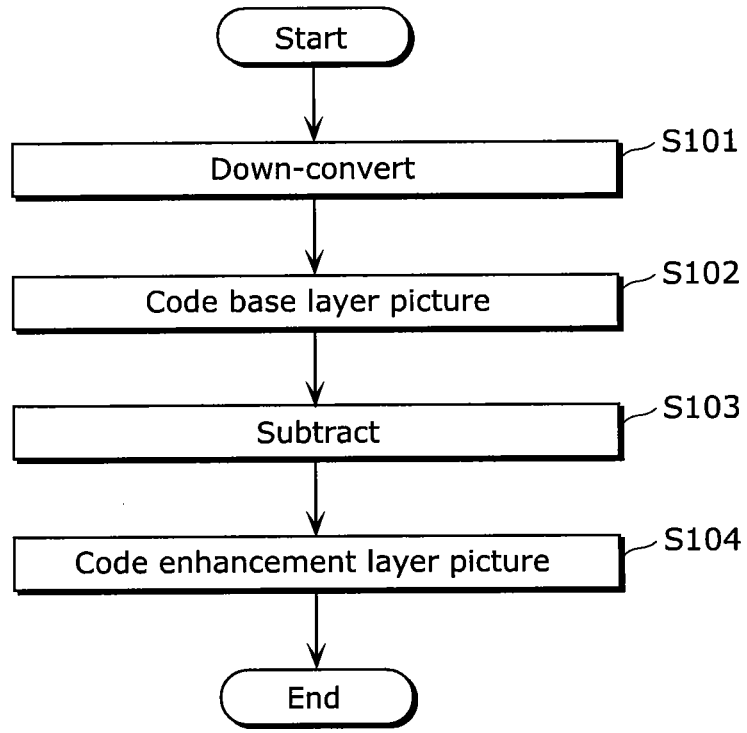
FIG. 7 is a flowchart showing processing of an image coding apparatus according to a technique related to the present invention.

FIG. 7 is a flowchart showing the processing of the image coding apparatus shown in FIG. 3.

First, the down-converter 102 down-converts the 10-bit picture D31 to generate the base layer picture D32 which is an 8-bit picture (S101).

Next, the MVC encoder 101 codes the base layer picture D32 as a base layer picture (S102). The MVC encoder 101 then decodes the coded base layer picture D32 to generate the reconstructed picture D33.

Next, the subtractor 103 generates the enhancement layer picture D34 from the difference obtained by subtracting the reconstructed picture D33 from the 10-bit picture D31 (S103).

Next, the MVC encoder 101 codes the enhancement layer picture D34 as a non-base layer picture (S104). The MVC encoder 101 then outputs the coded base layer picture D32 and the coded enhancement layer picture D34 as the MVC bitstream D35.

Figure 8:
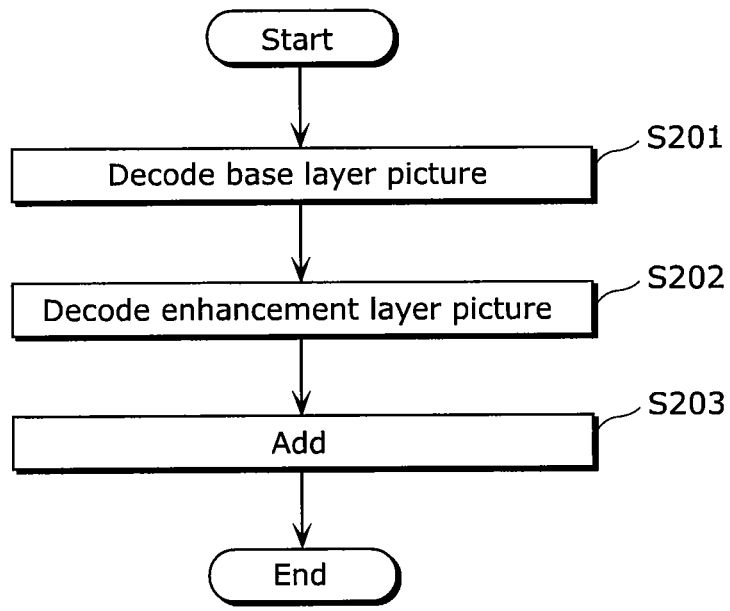
FIG. 8 is a flowchart showing processing of an image decoding apparatus according to a technique related to the present invention.

FIG. 8 is a flowchart showing the processing of the image decoding apparatus shown in FIG. 5.

First, the MVC decoder 201 decodes a base layer picture from the base layer bitstream D51 (S201).

Next, the MVC decoder 201 decodes an enhancement layer picture from the enhancement layer bitstream D52 (S202). The MVC decoder 201 then generates the picture sequence D53.

Next, the adder 202 generates the 10-bit picture D56 by adding up the base layer picture D54 and the enhancement layer picture D55 which are included in the picture sequence D53 (S203).

As described above, the image coding apparatus according to the technique related to the present invention down-converts a 10-bit picture to generate an 8-bit picture. The image coding apparatus then codes the 8-bit picture as a base layer picture. Furthermore, the image coding apparatus codes, as an 8-bit non-base layer picture, a difference value between the 10-bit picture and the 8-bit picture. With this, the 10-bit picture is divided to be separately coded as the 8-bit base layer picture and the 8-bit non-base layer picture.

Moreover, the image decoding apparatus according to the technique related to the present invention decodes the 8-bit base layer picture and the 8-bit non-base layer picture. The image decoding apparatus then generates a 10-bit picture by synthesizing the decoded base layer picture and the decoded non-base layer picture.

Note that although the technique related to the present invention uses an 8-bit picture and a 10-bit picture as an example, the bit-depth is not limited to 8 bits or 10 bits. Even when the combination of the bit-depths is different from 8 bits and 10 bits, the image coding apparatus and the image decoding apparatus can code or decode a picture having a bit-depth higher than the bit-depth of a picture which can be coded or decoded by the MVC encoder 101 and the MVC decoder 201.

However, as a result of dividing the 10-bit picture to be separately coded as the 8-bit base layer picture and the 8-bit non-base layer picture, for example, the technique related to the present invention has a problem of an increase in the amount of data to be transmitted. The present invention solves this problem.

Hereinafter, an image coding apparatus and an image decoding apparatus according to an aspect of the present invention will be described in detail.

Embodiment 1

Figure 9:
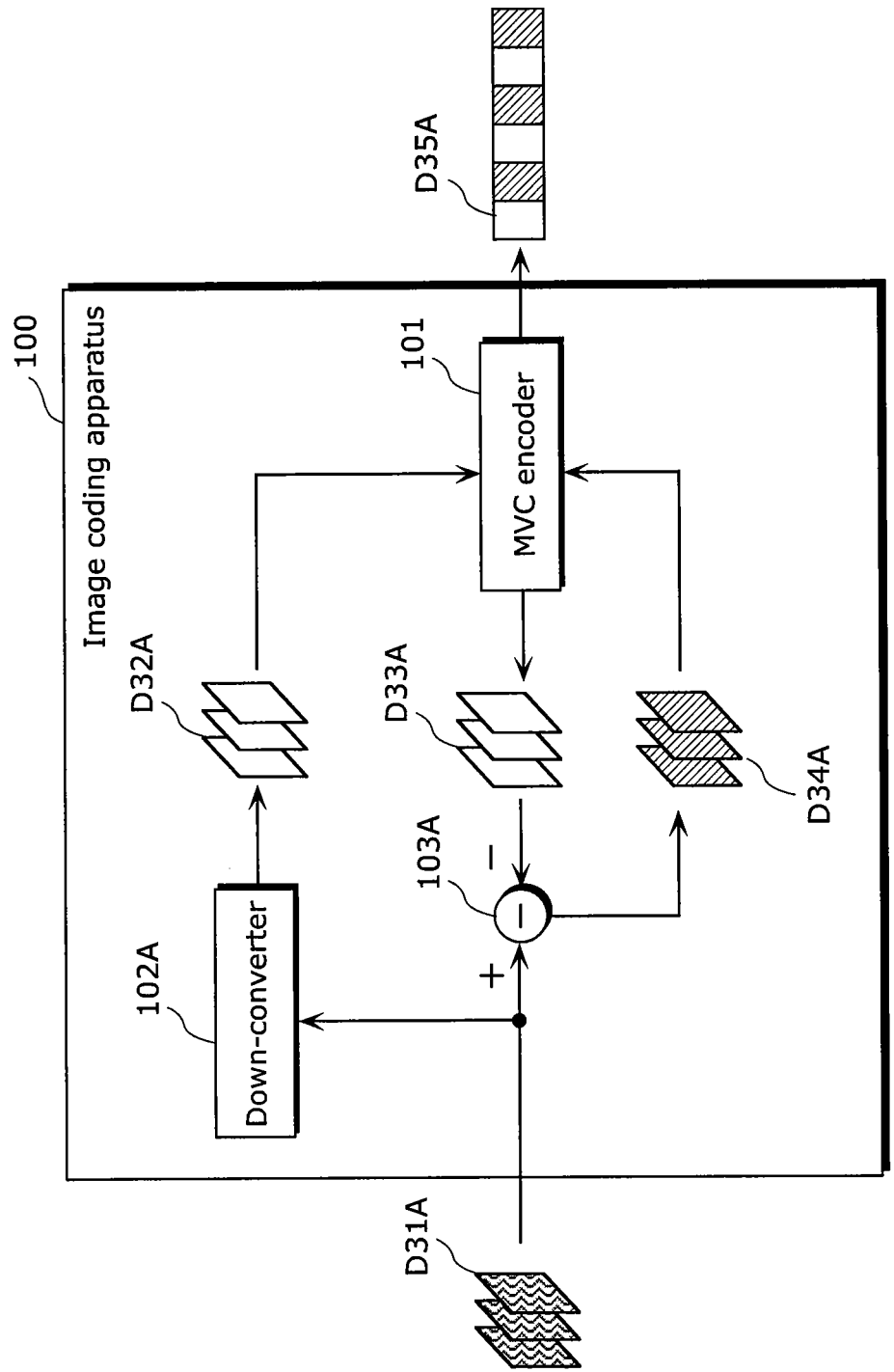
FIG. 9 shows functional blocks of an image coding apparatus according to Embodiment 1 of the present invention.

FIG. 9 shows functional blocks of an image coding apparatus 100 according to Embodiment 1 of the present invention.

As shown in FIG. 9, the image coding apparatus 100 according to the present embodiment includes an MVC encoder 101, a down-converter 102A, and a subtractor 103A. Note that a detailed description of the configuration identical to that in FIG. 4 will be omitted.

The image coding apparatus 100 is an image coding apparatus which codes a target picture having a bit-depth higher than a predetermined bit-depth. Here, the bit-depth indicates an information capacity per pixel. Hereinafter, the target picture inputted to the image coding apparatus 100 will be described as a 12-bit picture. That is to say, a picture D31A shown in FIG. 9 is a 12-bit picture. Furthermore, the predetermined bit-depth is assumed to be 8 bits.

The down-converter 102A generates a base layer picture by performing down-conversion on the target picture to reduce the bit-depth of the target picture by a first value so that the bit-depth of the target picture equals a predetermined bit-depth. More specifically, the down-converter 102A generates a base layer picture D32A that is an 8-bit picture by down-converting, by 4 bits, the bit-depth of the 12-bit picture D31A that is the target picture to be coded.

The MVC encoder 101 codes the base layer picture D32A and generates a reconstructed picture D33A by decoding the coded base layer picture. The MVC encoder 101 also codes an enhancement layer picture D34A. Moreover, the MVC encoder also functions as an output unit which outputs the coded base layer picture, the coded enhancement layer picture, and other additional information.

To be more specific, referring to FIG. 4 again, the MVC encoder 101 includes a first encoder which codes the base layer picture D32A and decodes the coded base layer picture D32A, a second encoder which codes the enhancement layer picture D34A, and a multiplexer. The multiplexer generates an MVC bitstream D35A that is a bitstream conforming to a multiview video coding (MVC) standard, by multiplexing a base layer bitstream which includes the coded base layer picture D32A and an enhancement layer bitstream which includes the coded enhancement layer picture D34A. The multiplexer outputs the generated MVC bitstream D35A.

The first encoder, the second encoder, and the multiplexer are configured as the MVC encoder.

The subtractor 103A performs shift amount adjustment on the reconstructed picture to increase the bit-depth of the reconstructed picture by a second value (also referred to as a value b). After that, based on the reconstructed picture on which the shift amount adjustment has been performed and the target picture, the subtractor 103A generates an enhancement layer picture that is a picture for enhancing the quality of the base layer picture and has the same bit-depth as the bit-depth of the base layer picture. Note that the second value may be a value greater than or equal to 0 and less than the first value, for example.

Next, referring to FIG. 10, the processing performed by the subtractor 103A will be described in more detail.

Figure 10:
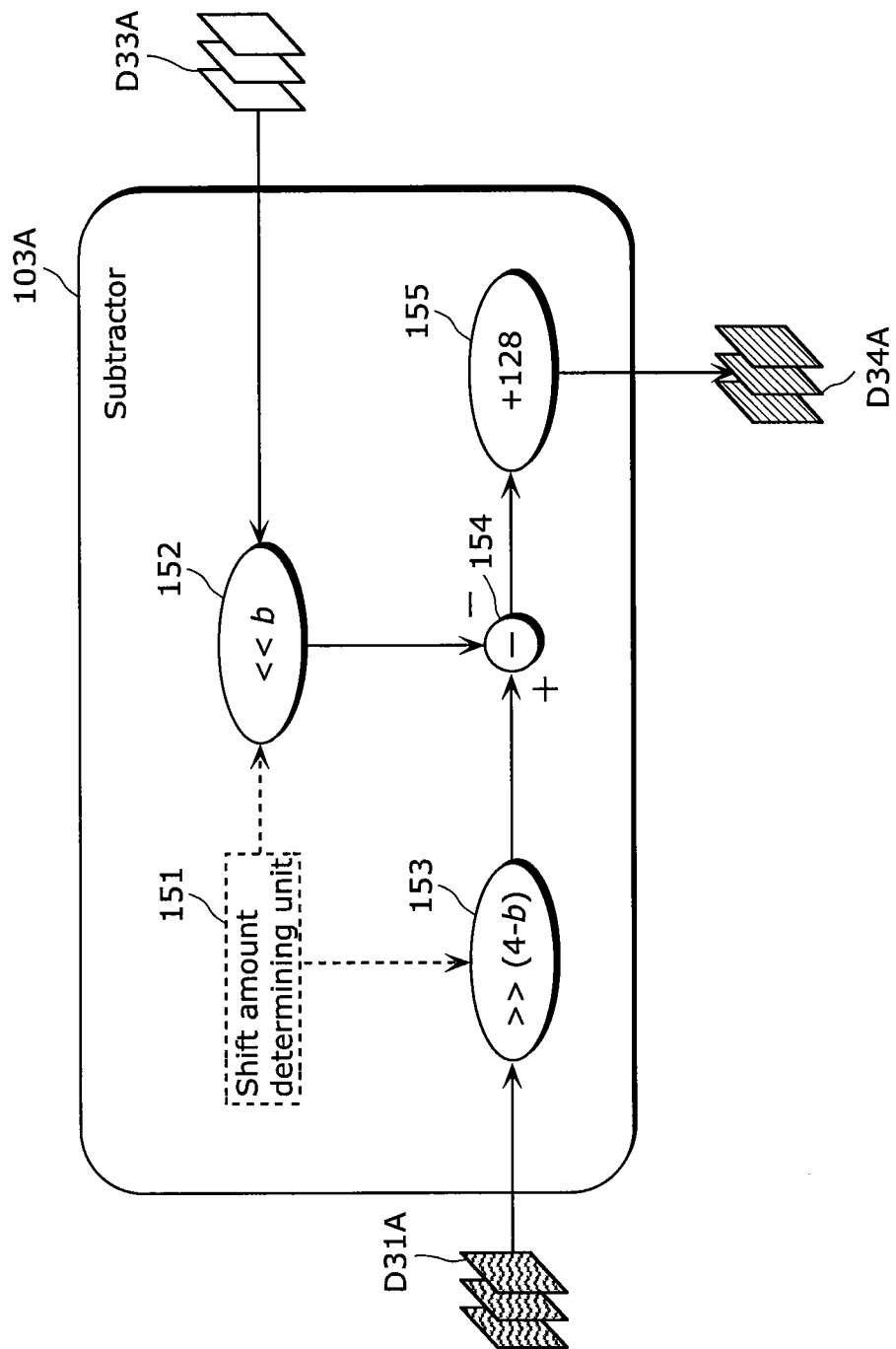
FIG. 10 shows functional blocks of a subtractor.

FIG. 10 shows functional blocks of the subtractor 103A. The subtractor 103A subtracts, from each of the pixel values of pixels included in a picture having a bit-depth obtained by reducing the bit-depth of the target picture by a third value that is a difference between the first value and the second value, the pixel value of a corresponding one of pixels included in the reconstructed picture on which the shift amount adjustment has been performed. The subtractor 103A then generates an enhancement layer picture using, out of bit information indicating a result of the subtraction, bit information included in a range of the predetermined bit-depth from a lower bit.

More specifically, as shown in FIG. 10, the subtractor 103A includes a shift amount determining unit 151, a bit shifter 152 which shifts up a bit sequence by a predetermined value of b bits, a bit shifter 153 which shifts down a bit sequence by 4-b bits, an operator 154 which performs subtraction between two inputs, and an operator 155 which performs addition of a value determined in advance.

Note that the value b, which is the second value, is a constant satisfying the relationship of the first value−b=the third value. Based on the target picture, the base layer picture, or the reconstructed picture, the image coding apparatus 100 determines the magnitude of the value b for each target picture, each base layer picture, or each reconstructed picture, for example, on which the magnitude determination in based.

Note that as described earlier, the subtractor 103A is a structural element that generates an enhancement layer picture, and thus, the subtractor is also called a generating unit.

The bit shifter 153 shifts down, by 4−b bits that is the third value, the bit-depth of the 12-bit picture D31A inputted to the subtractor 103A. More specifically, the bit shifter 153 bit-shifts, to the right by 4−b bits, each of the pixel values of pixels included in the 12-bit picture D31A.

Furthermore, the bit shifter 152 shifts up, by b bits (i.e., a value obtained by subtracting the third value from the first value), the bit-depth of the reconstructed picture D33A inputted to the subtractor 103A. More specifically, the bit shifter 152 bit-shifts, to the left by b bits, each of the pixel values of the pixels included in the reconstructed picture D33A.

After that, the operator 154 subtracts the output of the bit shifter 152 from the output of the bit shifter 153 for each set of corresponding pixels.

Here, the operator 155 may add a predetermined value to the value obtained by the subtraction of the pixel value of a corresponding one of the pixels included in the reconstructed picture on which the shift amount adjustment has been performed, from each of the pixel values of the pixels included in the target picture having a bit-depth reduced by the third value. Here, the predetermined value which the operator 155 may add to the result of the above subtraction is a value that makes each of the pixel values of pixels included in the enhancement layer picture a positive value. In FIG. 10, for the output of the operator 154, the operator 155 adds 128 to each pixel. The purpose of this is as described in relation to the technique related to the present invention.

Lastly, the subtractor 103A extracts, from the output of the operator 155, the lower 8 bits of each pixel to generate an enhancement layer picture D34A having 8 bits. This is because the predetermined bit-depth is 8 bits in the present embodiment.

The shift amount determining unit 151 determines the second value based on the characteristics of the target picture, the base layer picture, or the reconstructed picture. Furthermore, a value corresponding to the second value (i.e., value b) is added to a bitstream conforming to the MVC standard and is outputted by the multiplexer included in the MVC encoder 101, for example.

Note that the value corresponding to the second value includes, other than the second value, a value which allows the second value to be reversibly calculated by the image decoding apparatus 200 by inversely performing the operation performed on the second value by the image coding apparatus 100.

Generally, when the bit-depth is down-converted (e.g., when bit truncation is performed), an artifact in the displayed picture is more significant in relatively less complicated regions of the picture (i.e., in regions in which the low frequency components among the spatial-frequency components are visually more dominant). In these regions, a visible artifact such as banding is noticeable in the down-converted picture. On the other hand, the artifact resulting from the down-conversion of the bit-depth is less noticeable in high-density, complicated regions (that is, regions in which the high frequency components among the spatial-frequency components are visually more dominant).

Using such characteristics, the shift amount determining unit 151 determines the value b in such a manner as to solve a trade-off between the artifact occurrence and the coded data size. More specifically, the shift amount determining unit 151 determines a smaller value as the value b when the picture has complicated luminance variance. On the other hand, the shift amount determining unit 151 determines a larger value as the value b when the picture has simple luminance variance.

In other words, the shift amount determining unit 151 determines the value b, which is the second value, such that the value b increases when the low frequency components among the spatial-frequency components of the base layer picture are visually more dominant.

As a result, the image coding apparatus 100 can reduce, out of the amount of information included in the 12-bit picture D31A, the amount of information to be transmitted as the enhancement layer picture D34A, to an extent that such reduction is not visibly noticeable.

For example, referring to FIG. 10, when b=4 is satisfied (that is, when the third value is 0), the enhancement layer picture D34A includes information corresponding to the lower 4 bits of each pixel included in the 12-bit picture D31A. On the other hand, when b=0 is satisfied (that is, when the third value is 4), the enhancement layer picture D34A does not include information included in the 12-bit picture D31A.

To be accurate, the enhancement layer picture D34A also includes, in addition to part of picture information included in the 12-bit picture D31A, information indicating compression distortion, which is the difference between a picture before being coded and the picture after being coded. Therefore, even when b=0 is satisfied, generation of the enhancement layer picture D34A is beneficial as a means for transmitting the information indicating the compression distortion to an image decoding apparatus which will be described later.

Note that any method can be used by the down-converter 102A and the subtractor 103A for respectively generating the base layer picture D32A and the enhancement layer picture D34A by adjusting the bit-depth of a picture.

For example, as described in relation to FIG. 10, the down-converter 102A may generate the base layer picture by performing the down-conversion to shift-down, by the first value, the bit sequence of each of the pixel values of the pixels included in the target picture. Similarly, the subtractor 103A may shift down, by the third value, the bit sequence of each of the pixel values of the pixels included in the target picture, and shift up, by the second value, the bit sequence of each of the pixel values of the pixels included in the reconstructed picture. In this case, the subtractor 103A may generate the enhancement layer picture from the difference between each of the pixel values, whose bit sequence has been shifted down, of the pixels included in the target picture and the pixel value, whose bit sequence has been shifted up, of a corresponding one of the pixels included in the reconstructed picture.

Alternatively, the down-converter 102A may generate the base layer picture by performing the down-conversion to divide, by a predetermined divisor, each of the pixel values of the pixels included in the target picture so that the bit-depth of the target picture is reduced by the first value. Similarly, the subtractor 103A may divide, by a predetermined divisor, each of the pixel values of the pixels included in the target picture so that the bit-depth of the target picture is reduced by the third value, and multiply, by a predetermined multiplier, each of the pixel values of the pixels included in the reconstructed picture so that the bit-depth of the reconstructed picture increases by the second value. In this case, the subtractor 103A may generate the enhancement layer picture from the difference between each of the pixel values, which is obtained from the above division, of the pixels included in the target picture and the pixel value, which is obtained from the above multiplication, of a corresponding one of the pixels included in the reconstructed picture.

So far, the image coding apparatus 100 according to Embodiment 1 of the present invention has been described.

Next, referring to FIG. 11 and FIG. 12, an image decoding apparatus 200 according to Embodiment 1 of the present invention will be described.

Figure 11:
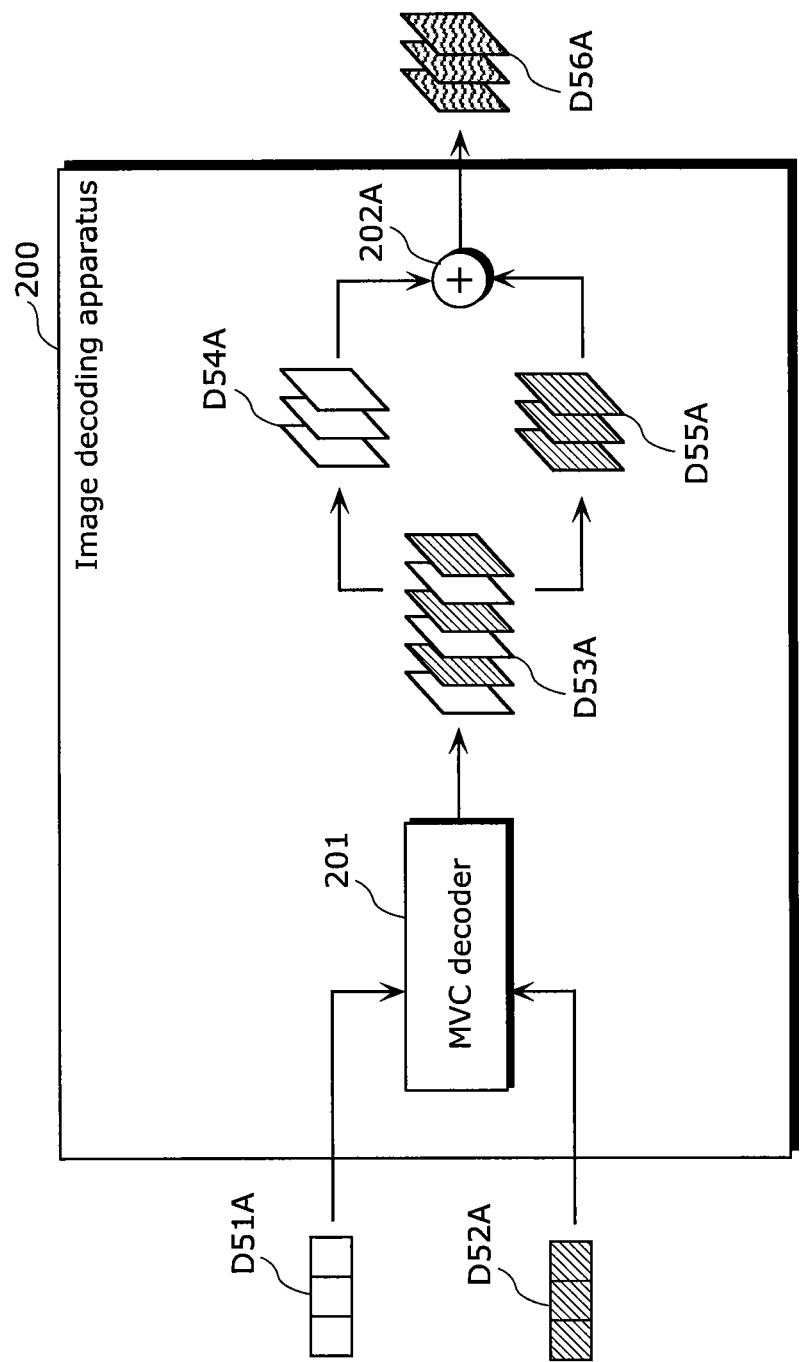
FIG. 11 shows functional blocks of an image decoding apparatus according to Embodiment 1 of the present invention.

FIG. 11 shows functional blocks of the image decoding apparatus 200 according to Embodiment 1 of the present invention. The image decoding apparatus 200 is an image decoding apparatus which decodes a picture from a bitstream to generate a target picture having a bit-depth higher than a predetermined bit-depth by the first value. Here, the bit-depth indicates an information capacity per pixel.

As shown in FIG. 11, the image decoding apparatus 200 includes an MVC decoder 201 and an adder 202A. Note that a detailed description of the configuration identical to that in FIG. 6 will be omitted.

The MVC decoder 201 decodes, from a base layer bitstream D51A, a base layer picture D54A having a bit-depth equal to the predetermined bit-depth. The MVC decoder 201 also decodes, from an enhancement layer bitstream D52A, an enhancement layer picture D55A having a bit-depth equal to the predetermined bit-depth. Note that the base layer bitstream D51A and the enhancement layer bitstream D52A are obtained by demulplexing the MVC bitstream D35A, for example. Furthermore, the MVC decoder 201 may output the base layer picture D54A and the enhancement layer picture D55A as a picture sequence D53A.

More specifically, the MVC decoder 201 includes: a first decoder which decodes the base layer picture D54A from the base layer bitstream D51A; a second decoder which decodes the enhancement layer picture D55A from the enhancement layer bitstream D52A; and a multiplexer. Here, the multiplexer generates the picture sequence D53A by multiplexing the base layer picture D54A and the enhancement layer picture D55A. The first encoder, the second encoder, and the multiplexer are configured as an MVC decoder.

The adder 202A obtains the second value from a bitstream, and generates a target picture D56A by adding up the base layer picture D54A and the enhancement layer picture D55A based on the obtained second value.

For example, in the case of obtaining a bitstream conforming to the MVC standard, the adder 202A obtains the second value added to the bitstream conforming to the MVC standard. After that, the adder 202A adds up the base layer picture D54A and the enhancement layer picture D55A based on the second value.

Figure 12:
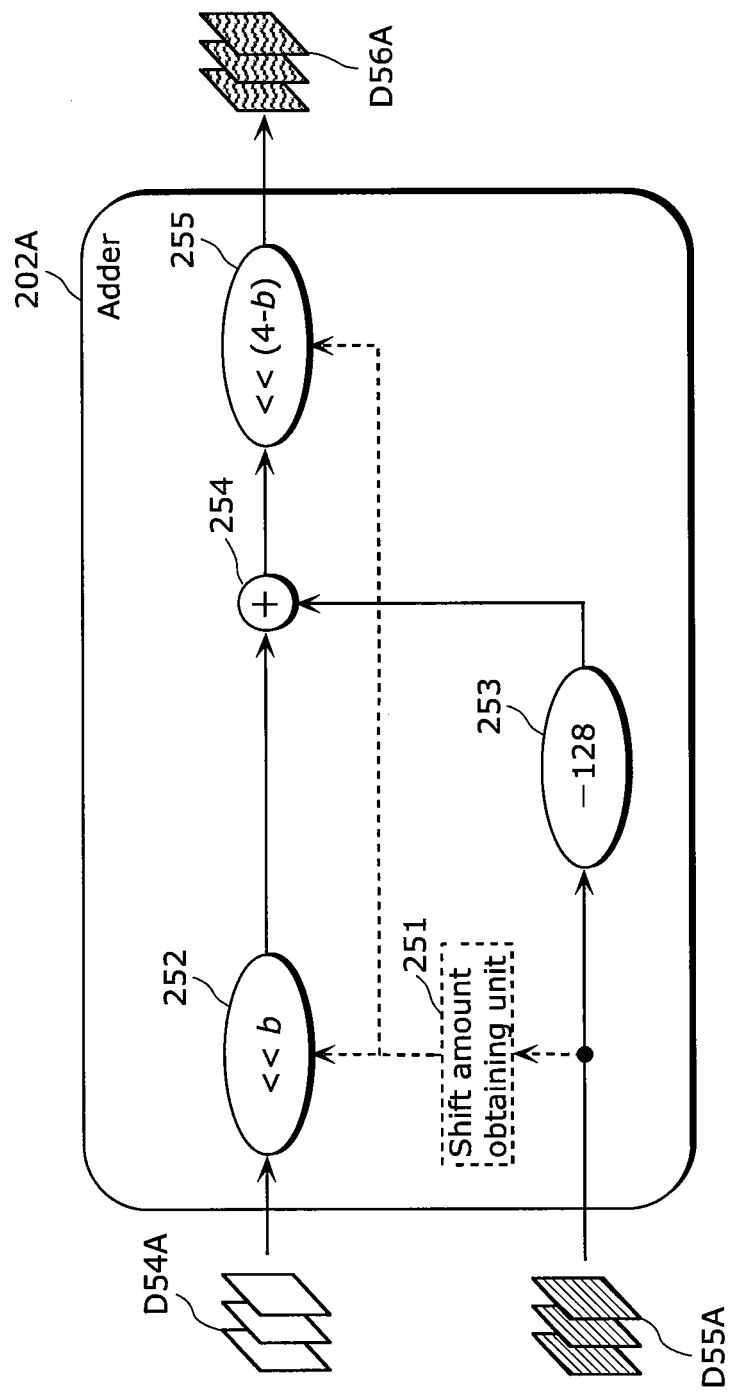
FIG. 12 shows detailed functional blocks of an adder.

FIG. 12 shows detailed functional blocks of the adder 202A.

The adder 202A performs up-conversion on the base layer picture to increase the bit-depth of the base layer picture by the value b. To put it differently, the adder 202A performs up-conversion on the base layer picture to increase the bit-depth of the base layer picture by the second value. After that, the adder 202A generates a synthesized picture of the base layer picture on which the up-conversion has been performed and the enhancement layer picture, by adding up each of the pixel values of pixels of the base layer picture and the pixel value of a corresponding one of pixels of the enhancement layer picture. Moreover, the adder 202A generates the target picture by increasing the bit-depth of the synthesized picture by the third value.

More specifically, as shown in FIG. 12, the adder 202A includes: a shift amount obtaining unit 251; a bit shifter 252 which shifts up a bit sequence by b bits where b is a predetermined value; an operator 253 which subtracts a value determined in advance; an adder 254 which adds up two inputs; and a bit shifter 255 which shifts up a bit sequence by 4-b bits.

The bit shifter 252 shifts up, by b bits, the bit-depth of the base layer picture D54A inputted to the adder 202A and having 8 bits. More specifically, the bit shifter 252 bit-shifts, to the left by b bits, each of the pixel values of the pixels included in the base layer picture D54A. This processing corresponds to the up-conversion described earlier.

After that, the adder 254 adds up the output of the bit shifter 252 and the output of the operator 253 for each set of corresponding pixels.

Note that before the adder 254 adds up the base layer picture and the enhancement layer picture, the operator 253 included in the adder 202A subtracts, from each of the pixel values of the pixels included in the enhancement layer picture, a value added at the time of coding (e.g., 128).

Lastly, the bit shifter 255 shifts up, by 4-b (i.e., the third value), the bit-depth of the synthesized picture obtained by the addition performed by the adder 254. More specifically, the bit shifter 255 bit-shifts, to the left by 4-b bits, each of the pixel values of pixels included in the synthesized picture. As a result, the target picture D56A having 12 bits is generated.

The shift amount obtaining unit 251 obtains a value which is added to, for example, the enhancement layer bitstream and corresponds to the second value. The shift amount obtaining unit 251 can obtain the third value from the obtained value corresponding to the second value. For example, in the case of obtaining the second value as the value corresponding to the second value, the shift amount obtaining unit 251 can obtain the third value as the first value minus the second value.

Furthermore, any method can be used by the bit shifter 252 and the bit shifter 255 included in the adder 202A for adjusting the bit-depth of a picture.

For example, as described in relation to FIG. 12, the adder 202A performs the up-conversion on the base layer picture by shifting up, by the value b that is the second value, the bit sequence of each of the pixel values of the pixels included in the base layer picture. Moreover, the adder 202A shifts up, by the third value, the bit sequence of each of the pixel values of the pixels included in the synthesized picture generated by the adder 254.

Alternatively, the adder 202A may perform the up-conversion on the base layer picture by multiplying, by a predetermined multiplier, each of the pixel values of the pixels included in the base layer picture so that the bit-depth of the base layer picture increases by the second value. Moreover, the adder 202A may multiply, by a predetermined multiplier, each of the pixel values of the pixels included in the synthesized picture generated by the adder 254, to increase the bit-depth of the synthesized picture by the third value.

Note that the above description is based on the assumption that the target picture D56A having 12 bits is generated from an 8-bit base layer bitstream and an 8-bit enhancement layer bitstream. However, the bit-depth of each picture is given by way of example, and the present invention is not limited to such bit-depths.

Next, referring to FIG. 13, an example of a method of determining the value b by the shift amount determining unit 151 included in the image coding apparatus 100 shall be described.

FIG. 13 shows an example of a result of determination of the value b, which is the second value, by the shift amount determining unit 151 according to the characteristics of the base layer picture.

In FIG. 13, the value b is determined for each scene. Note that a scene is a plurality of sequential pictures inputted to the image coding apparatus 100 as 12-bit source video. Here, b=0, b=4, b=2, and b=0 are set for a scene 1, a scene 2, a scene 3, and a scene 4, respectively. Note that as described later, the value b may be different for each of smaller units included in one scene.

As shown in FIG. 13, in the scene 1 and the scene 4, no artifact due to bit truncation from 12 bits to 8 bits is observed in the base layer picture. Therefore, for the scene 1 and the scene 4, the shift amount determining unit 151 determines that there is no need to increase the resolution of the base layer picture, and thus determines the value b as 0.

In the scene 3, artifact is observed in the base layer picture to some extent. Therefore, for the scene 3, the shift amount determining unit 151 determines that there is a need to increase the resolution of the base layer picture using the enhancement layer picture, and thus determines the value b as 2.

In the scene 2, severe artifact is observed in the base layer picture. Therefore, for the scene 2, the shift amount determining unit 151 determines that there is a need to increase, as much as possible, the resolution of the base layer picture using the enhancement layer picture, and thus determines the value b as 4.

The value b determined in this manner by the shift amount determining unit 151 is used by the image coding apparatus 100 for generating the enhancement layer picture. Furthermore, the determined value b is transmitted to the image decoding apparatus 200 for decoding.

Figure 14:
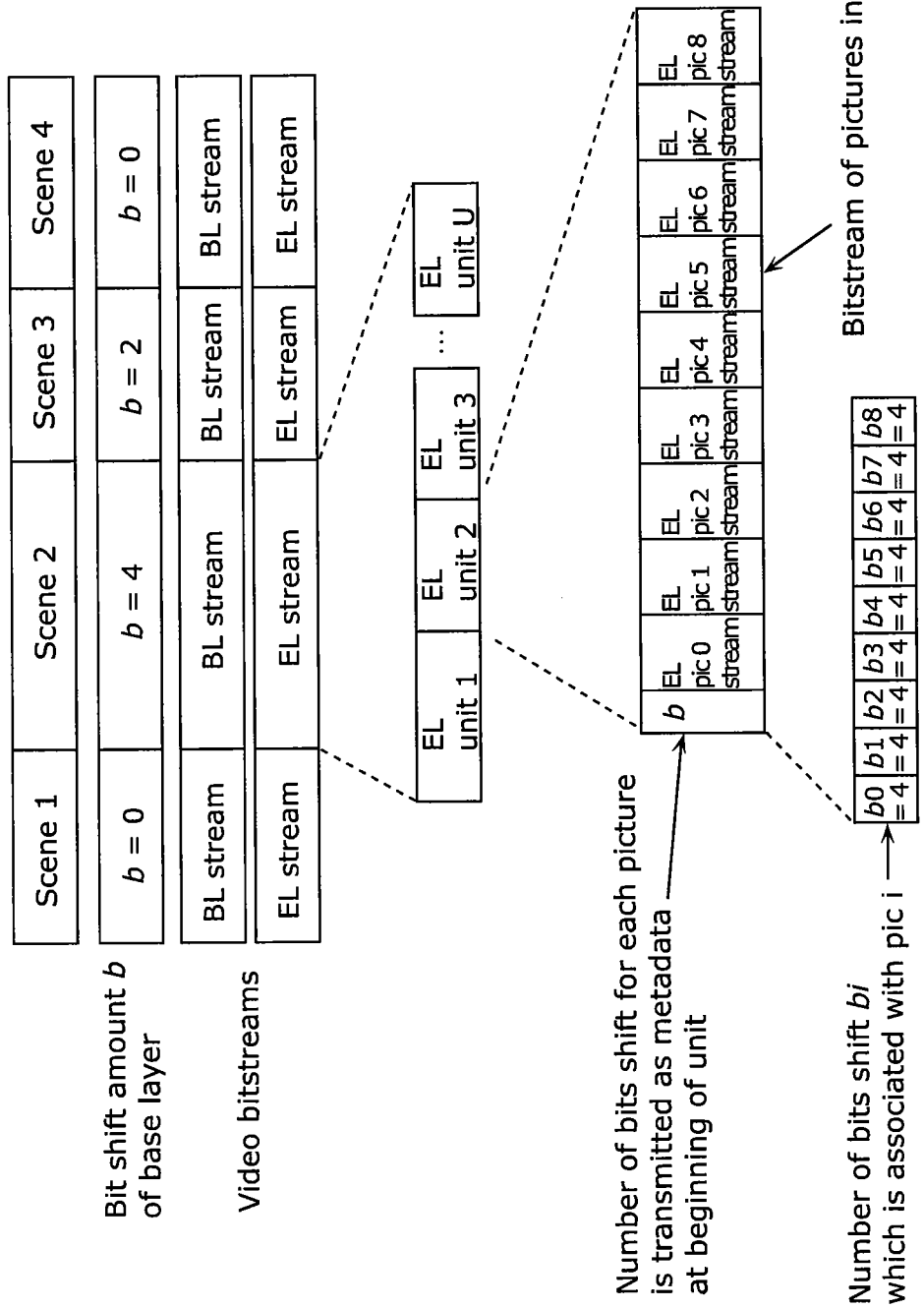
FIG. 14 shows an example of a method of transmitting a value b from an image coding apparatus to an image decoding apparatus by including the value b in a bitstream.

FIG. 14 shows an example of a method of transmitting the value b from the image coding apparatus 100 to the image decoding apparatus 200 by including the value b in a bitstream. Used here is an MVC structure (e.g., Stereo High Profile) which is for distributing 12-bit video intended for high bit-depth video applications.

As shown in FIG. 14, a base layer bitstream (hereinafter also referred to as BL stream) is transmitted as a bitstream of base views in the MVC structure. Furthermore, an enhancement layer bitstream (hereinafter also referred to as EL stream) is transmitted as a bitstream of non-base views in the MVC structure. The EL stream is divided into a plurality of units (unit 1 to unit U in FIG. 14). Here, any method can be used for dividing the EL stream into a plurality of units. For example, the EL stream maybe divided into a plurality of units per Group of Pictures (GOP).

Here, the image coding apparatus 100 transmits the value b to the image decoding apparatus 200 by adding, as metadata, to the beginning of each unit, the number of bits shift (i.e., value b) which is determined for a bitsteam of a plurality of pictures included in the unit. For example, in FIG. 14, metadata including values b (b0 to b8) each corresponding to one of 9 bitsteams of pictures (EL pic 0 stream to EL pic 8 stream) included in a unit 2 is added to the beginning of the unit 2 (e.g., picture header).

Note that the values b in the metadata may be different from each other. Furthermore, as shown in FIG. 14, the alignment order of the values b included in the metadata may be the same as the alignment order of bitstreams of pictures included in a corresponding EL unit, but the present invention is not limited to this alignment order. The values b may be added in any alignment order, and for example, even an application-specific order may be used as long as a correspondence between the values b and the bitstreams of pictures is shown.

More specifically, the MVC encoder 101 included in the image coding apparatus 100 may obtain the values b from the shift amount determining unit 151, and the multiplexer included in the MVC encoder 101 may include, in the enhancement layer bitstream, values corresponding to the values b.

In this case, the shift amount obtaining unit 251 included in the image decoding apparatus 200 may obtain the values b from the enhancement layer bitstream and the adder 202A may use the values b in generating target pictures.

As described above, the image coding apparatus 100 and the image decoding apparatus 200 according to the present embodiment can efficiently transmit the enhancement layer bitstream using the number of bits shift that is variable depending on the signal characteristics of a picture in a video sequence. This makes it possible to reduce the amount of data to be transmitted in the case of distributing high bit-depth video using a massively available 8-bit video processor.

Embodiment 2

The image coding apparatus 100 and the image decoding apparatus 200 according to Embodiment 1 include the MVC encoder and the MVC decoder, respectively. However, the present invention can be applied also to bitstreams other than the bitstreams conforming to the MVC standard.

Figure 15:
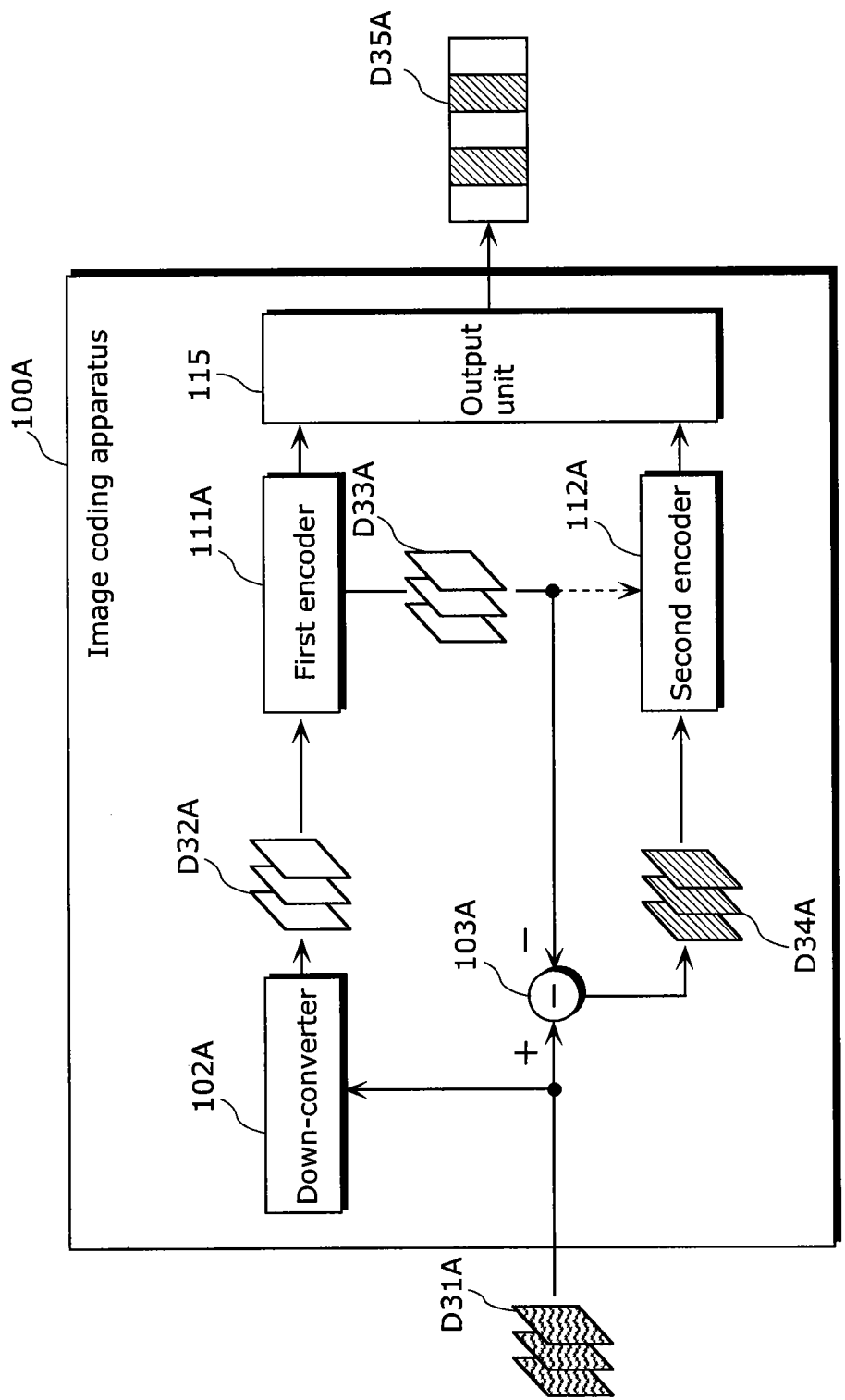
FIG. 15 shows functional blocks of an image coding apparatus according to Embodiment 2 of the present invention.

FIG. 15 shows functional blocks of an image coding apparatus 100A according to Embodiment 2 of the present invention. Note that a detailed description of the structural elements in common with the image coding apparatus 100 shown in FIG. 9 will be omitted.

As shown in FIG. 15, the image coding apparatus 100A includes, instead of the MVC encoder 101, a first encoder 111A, a second encoder 112A, and an output unit 115. Here, the first encoder 111A codes the base layer picture D32A and decodes the coded base layer picture D32A. The second encoder 112A codes the enhancement layer picture D34A.

The output unit 115 outputs the base layer bitstream which includes the coded base layer picture D32A and the enhancement layer bitstream which includes the coded enhancement layer picture D34A. At this time, the output unit 115 may multiplex the base layer bitstream and the enhancement layer bitstream and output the resultant as an MVC bitstream D35A. Moreover, the output unit 115 may include, in the base layer bitstream or the enhancement layer bitstream, a value corresponding to the value b determined by the shift amount determining unit 151, and output the value corresponding to the value b in such a form.

Note that the output unit 115 according to the present embodiment is the multiplexer included in the MVC encoder 101 according to Embodiment 1 when the output unit 115 is configured as a multiplexer which multiplexes, into a bitstream conforming to a multiview video coding (MVC) standard, the base layer bitstream including the base layer picture and the enhancement layer bitstream including the enhancement layer picture and which outputs the resulting MVC bitstream.

Figure 16:
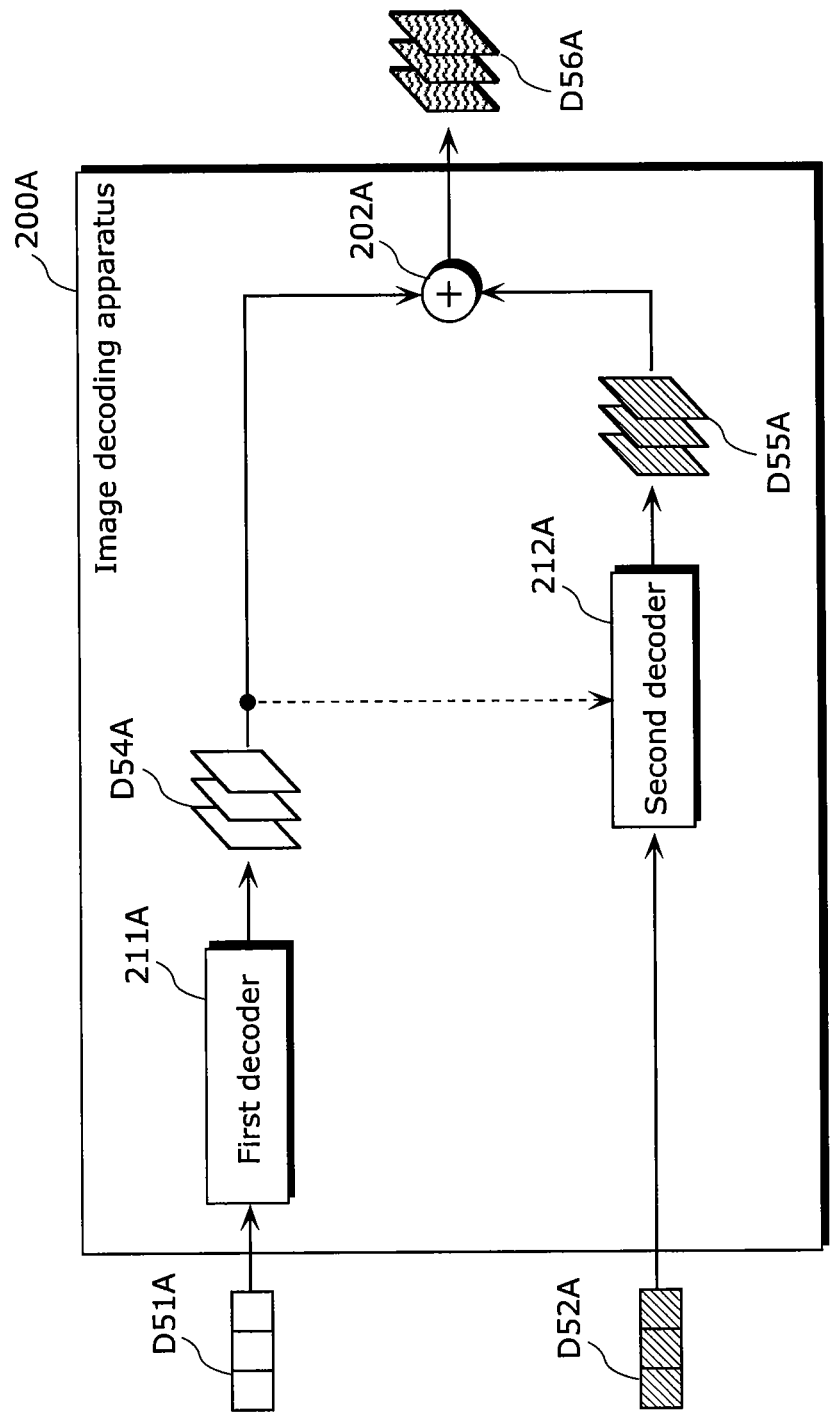
FIG. 16 shows functional blocks of an image decoding apparatus according to Embodiment 2 of the present invention.

FIG. 16 shows functional blocks of an image decoding apparatus 200A according to Embodiment 2 of the present invention. Note that a detailed description of the structural elements in common with the image decoding apparatus 200 shown in FIG. 11 will be omitted. The base layer bitstream D51A and the enhancement layer bitstream D52A shown in FIG. 16 are bitstreams obtained by demultiplexing in advance the MVC bitstream D35A which has resulted from multiplexing.

As shown in FIG. 16, the image decoding apparatus 200A includes a first decoder 211A and a second decoder 212A instead of the MVC decoder 201. Here, the first decoder 211A decodes the base layer picture D54A from the base layer bitstream D51A. The second decoder 212A decodes the enhancement layer picture D55A from the enhancement layer bitstream D52A.

In such a manner, the present invention can be implemented even by the image coding apparatus 100A which does not include the MVC encoder 101 and by the image decoding apparatus 200A which does not include the MVC decoder 201.

So far, the image coding apparatus according to Embodiments 1 and 2 of the present invention have been described, but embodiments of the image coding apparatus according to the present invention are not limited to these.

For example, although it has been described in relation to FIG. 10 that the subtractor 103A includes the shift amount determining unit 151, the subtractor 103A does not have to include the shift amount determining unit 151. Any structural element included in the image coding apparatus 100 other than the shift amount determining unit 151 may determine the value b. Alternatively, the image coding apparatus 100 may obtain, from an external device outside the image coding apparatus 100, the value b determined in advance. Even in this case, the same advantageous effect can be achieved.

Moreover, although it has been described in relation to FIG. 12 that the adder 202A includes the shift amount obtaining unit 251, the adder 202A does not have to include the shift amount obtaining unit 251. For example, any structural element included in the image decoding apparatus 200 other than the shift amount obtaining unit 251 may obtain the value b.

Furthermore, it has been described in the above embodiments that the MVC encoder 101 or the output unit 115 adds the value b to the enhancement layer bitstream. However, a structural element included in the image coding apparatus other than the MVC encoder 101 or the output unit 115 may add the value b to the bitstream. Moreover, the bitstream into which the value b is included is not limited to the enhancement layer bitstream. For example, the value b may be added to the base layer bitstream.

Note that in the above embodiments, the target picture to be coded has been described as the 12-bit picture D31A. However, a target picture having any bit-depth such as 10 bits or 8 bits, for example, may be coded by the image coding apparatus. In this case, the bit-depth of the picture to be coded is once shifted to 12 bits, and after that, the picture to be coded is inputted to the image coding apparatus, so that processing can be performed without modifying the image coding apparatus. This allows the picture to be transmitted as less distorted data.

Furthermore, even when b=0 is satisfied, the image coding apparatus and the image decoding apparatus according to an aspect of the present invention are beneficial. This is because even when b=0 is satisfied, the enhancement layer picture includes information regarding compression distortion, and use of this information regarding compression distortion allows decoding to be performed with less distortion on the base layer picture.

More specifically, the image coding apparatus according to an aspect of the present invention uses the reconstructed picture of the coded base layer picture in calculating the difference between the 12-bit picture and the 8-bit picture. This makes it possible to compensate for, at the time of coding the 12-bit picture, quantization distortion occurred when the 8-bit picture was coded.

Furthermore, the image decoding apparatus according to an aspect of the present invention can also generate the 8-bit picture by decoding only the base layer picture. With this, compatibility with a display apparatus capable of displaying only the 8-bit pictures can be maintained. In this case, the image coding apparatus and the image decoding apparatus may be configured as a video system including a distribution service which allows a user to download later on an enhancement layer picture stored in a storage on the Internet, for example. With this, the image decoding apparatus can obtain the base layer picture distributed in the form of a recording medium and the enhancement layer picture obtained by downloading, and reproduce the video on the recording medium as high-quality pictures by the above-described processing.

Furthermore, each of the MVC encoder 101 and the MVC decoder 201 shown in the technique related to the present invention does not need to have a capability to code or decode the 12-bit picture by itself. Even when the MVC encoder 101 and the MVC decoder 201 do not have such a capability, the image coding apparatus and the image decoding apparatus according to an aspect of the present invention can code or decode the 12-bit picture. This therefore prevents an increase in cost and time required for developing an image coding apparatus or an image decoding apparatus which processes a picture having a higher bit-depth.

Moreover, the MVC encoder 101 and the MVC decoder 201 shown in the technique related to the present invention can surely be used for coding or decoding a 3D picture.

Furthermore, each mathematical equation shown in the technique related to the present invention is a mere example, and other mathematical equations may be used. For example, as described earlier, a right shift operation is the same as division by a predetermined divisor. Likewise, a left shift operation is the same as multiplication by a predetermined multiplier.

Moreover, when performing down-conversion, the down-converter 102A may round off, round down, or round up a lower bit of a pixel value.

Embodiment 3

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 17:
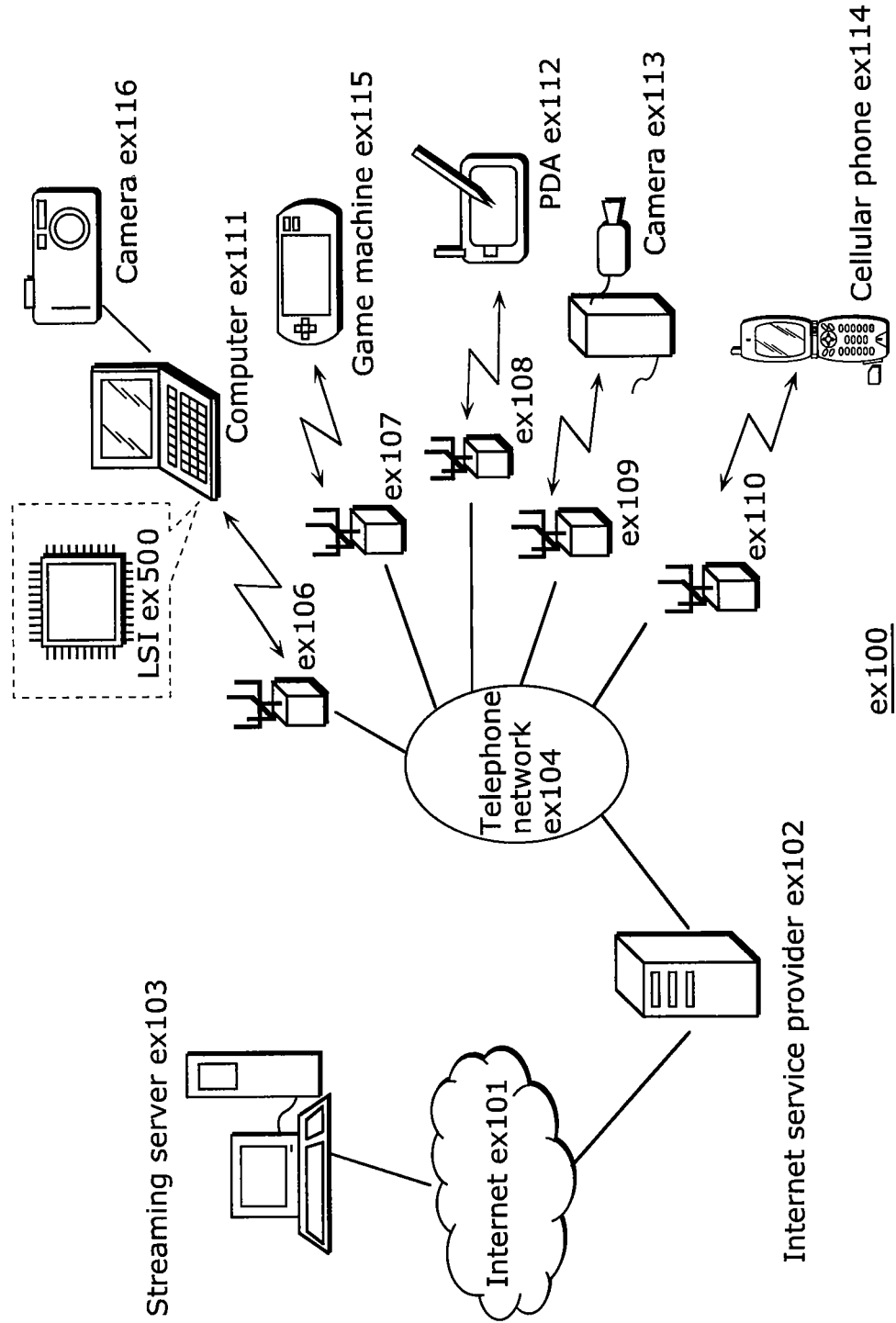
FIG. 17 shows an overall configuration of a content providing system for implementing content distribution services.

FIG. 17 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 17, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 18:
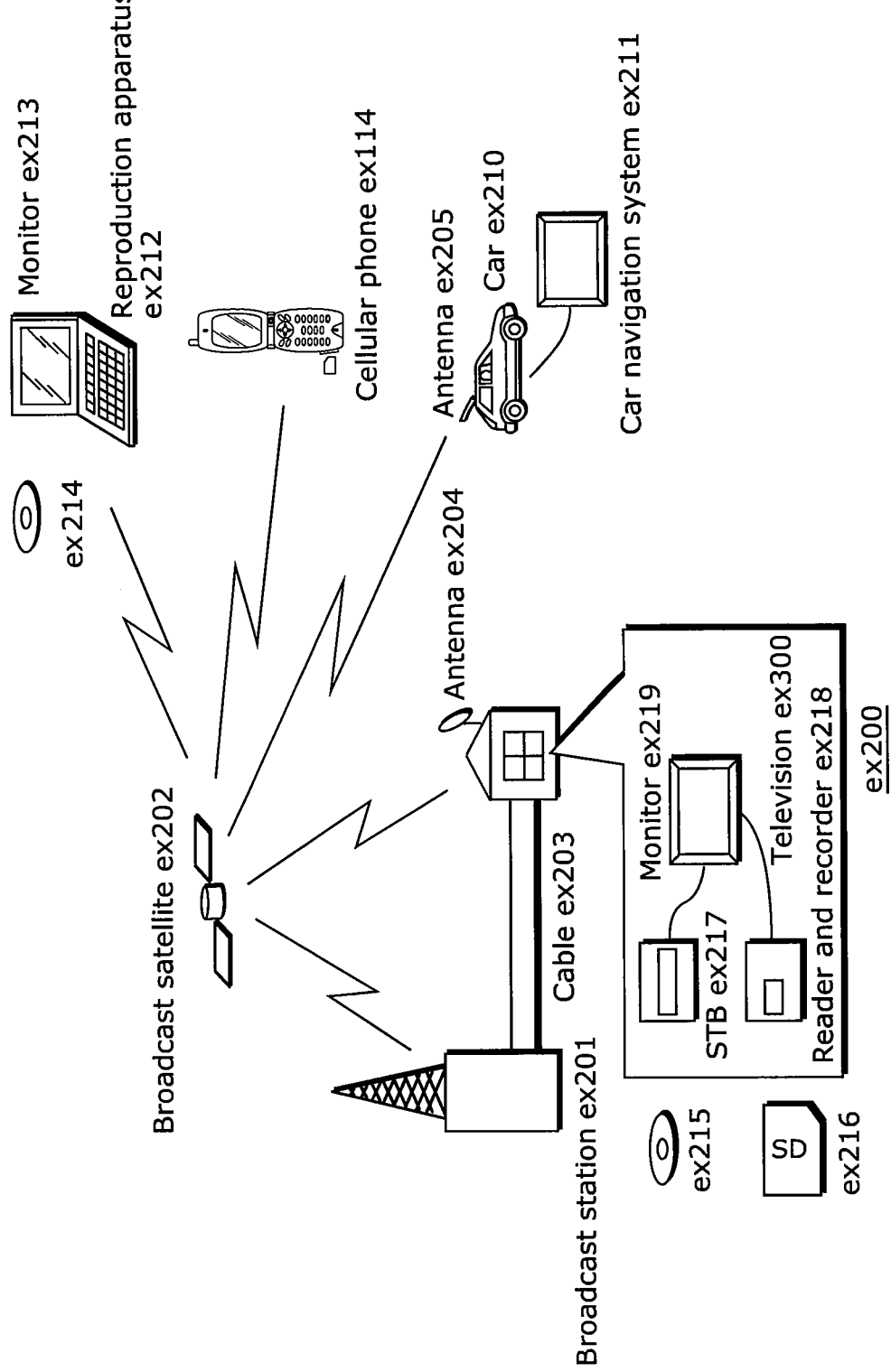
FIG. 18 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 18. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 19:
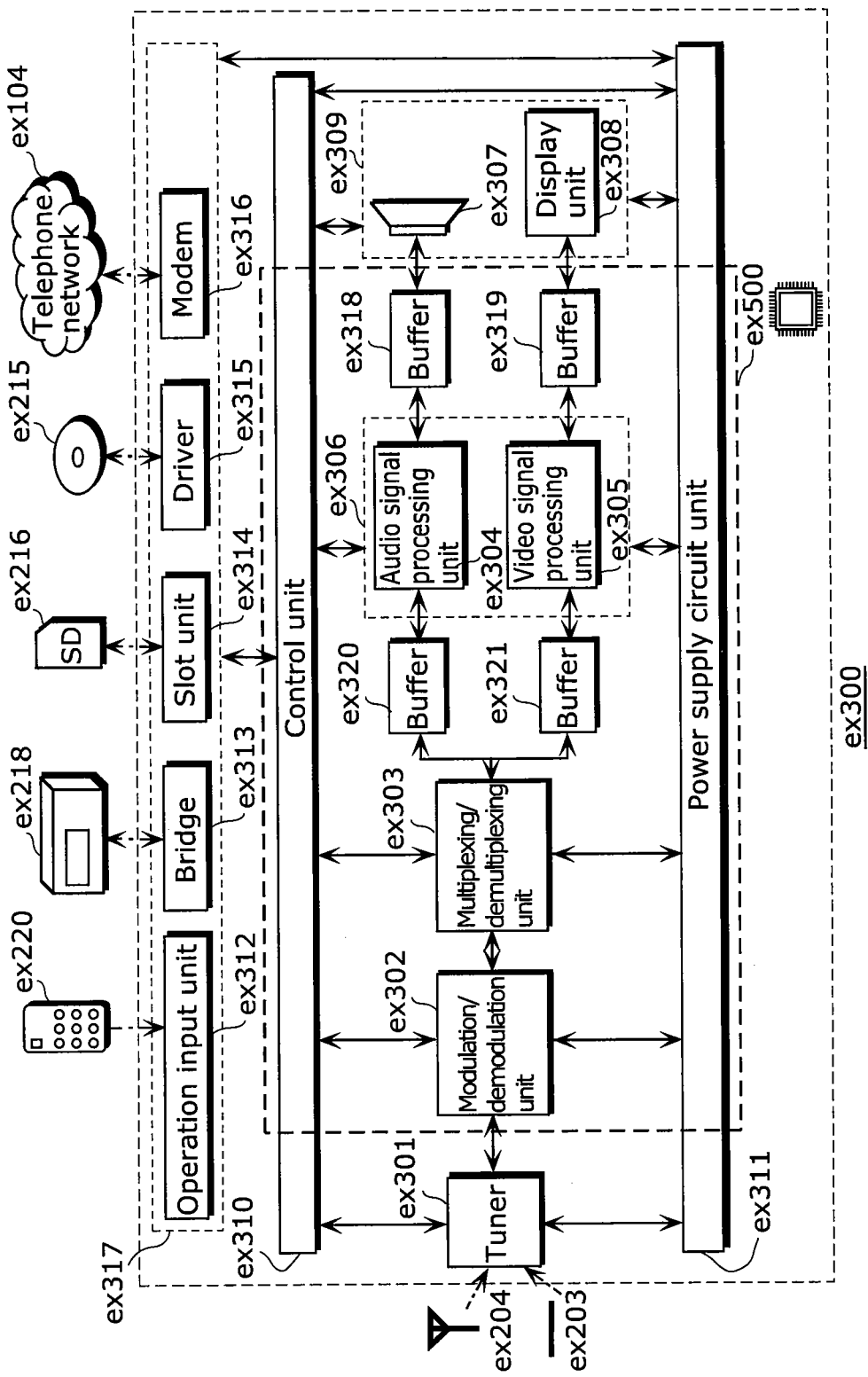
FIG. 19 shows a block diagram illustrating an example of a configuration of a television.

FIG. 19 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 20:
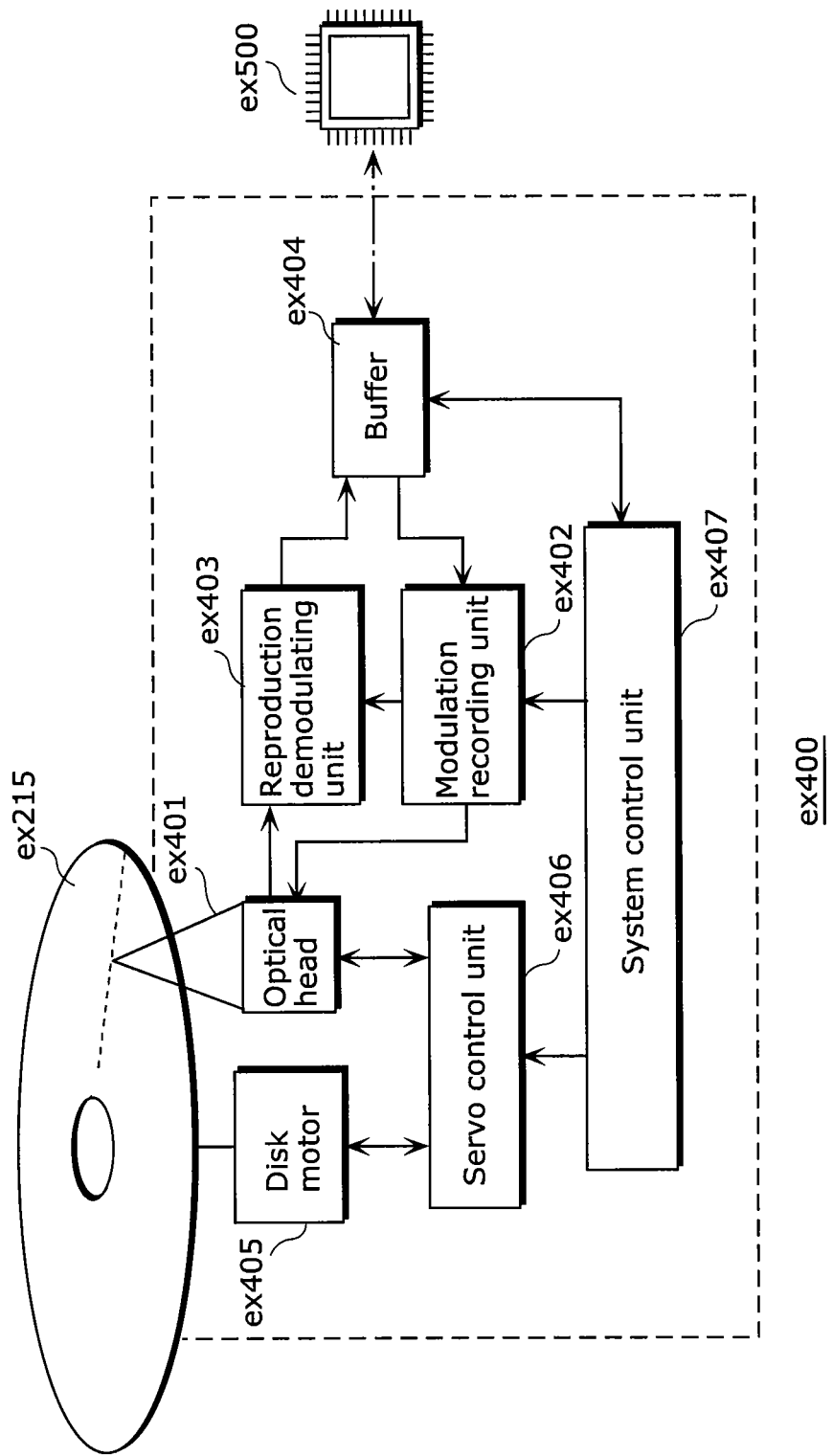
FIG. 20 shows a block diagram illustrating an example of a configuration of an information reproducing/recording unit that reads and writes information from and on a recording medium that is an optical disk.

As an example, FIG. 20 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 21:
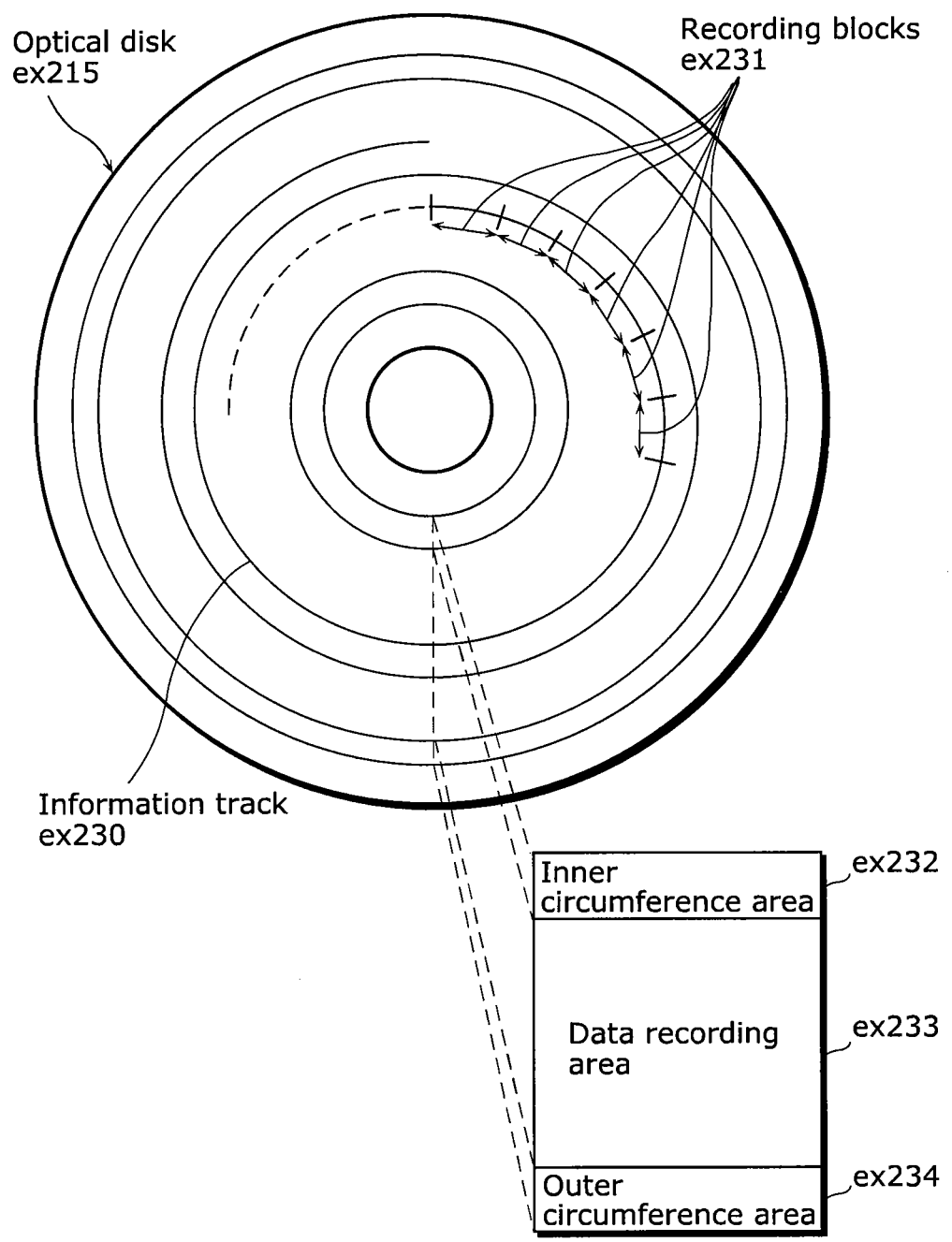
FIG. 21 shows an example of a configuration of a recording medium that is an optical disk.

FIG. 21 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 19. The same will be true for the configuration of the computer ex111, the cellular phone ex114, and others.

Figure 22A:
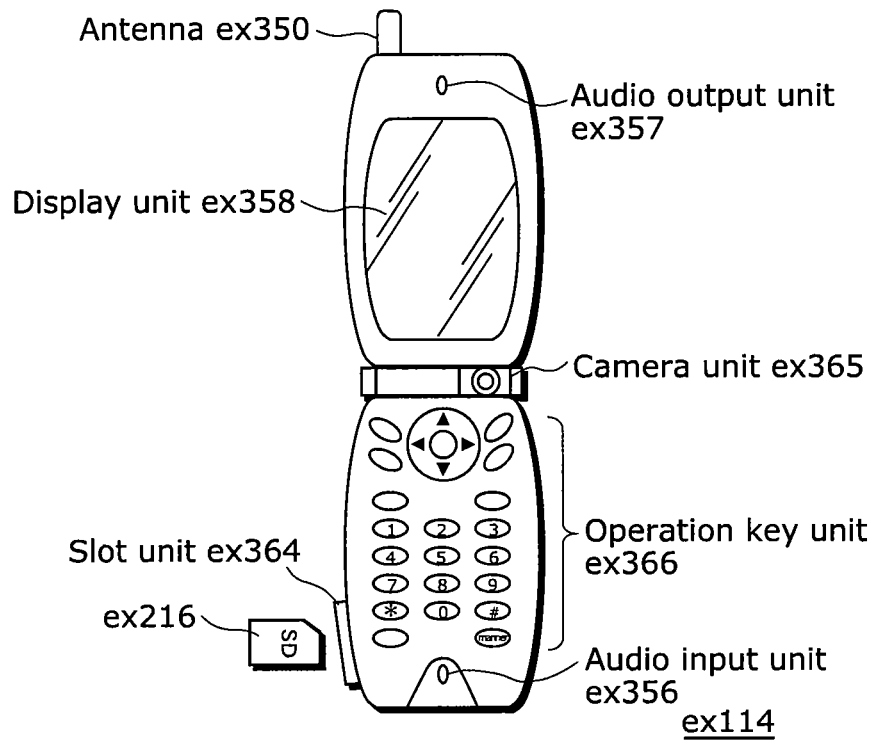
FIG. 22A shows an example of a cellular phone.

FIG. 22A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 22B:
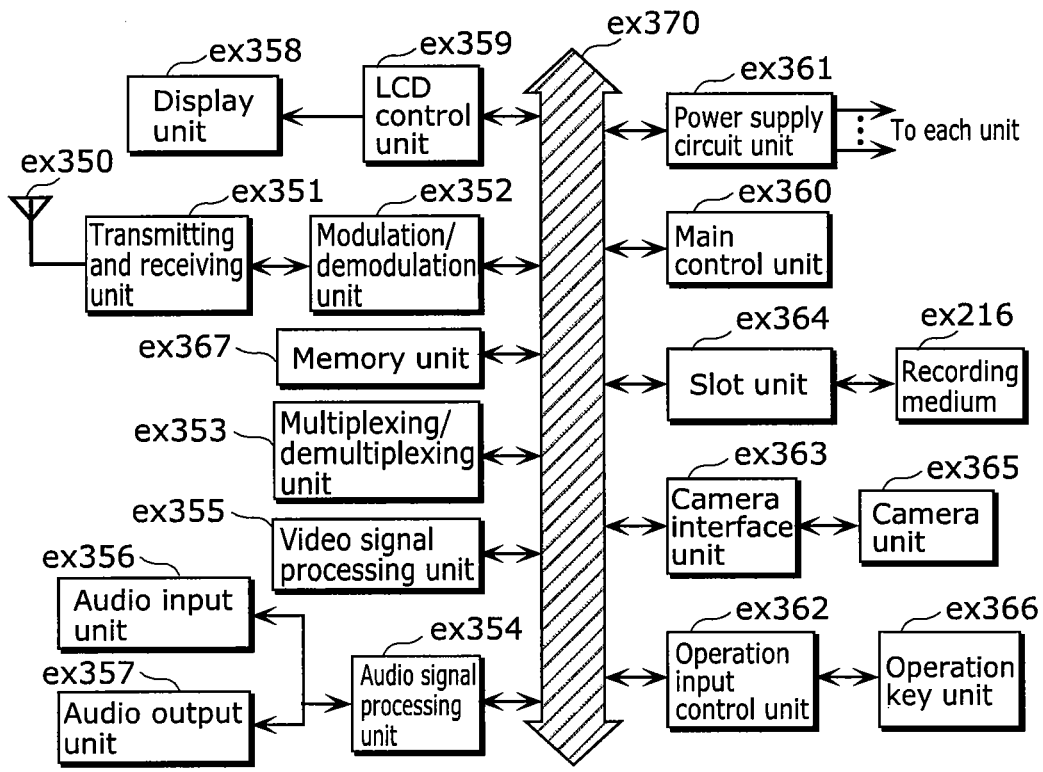
FIG. 22B is a block diagram showing an example of a configuration of a cellular phone.

Next, an example of a configuration of the cellular phone ex114 will be described with reference to FIG. 22B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bitstream and an audio data bitstream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 4

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 23 illustrates a structure of the multiplexed data. As illustrated in FIG. 23, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 24:
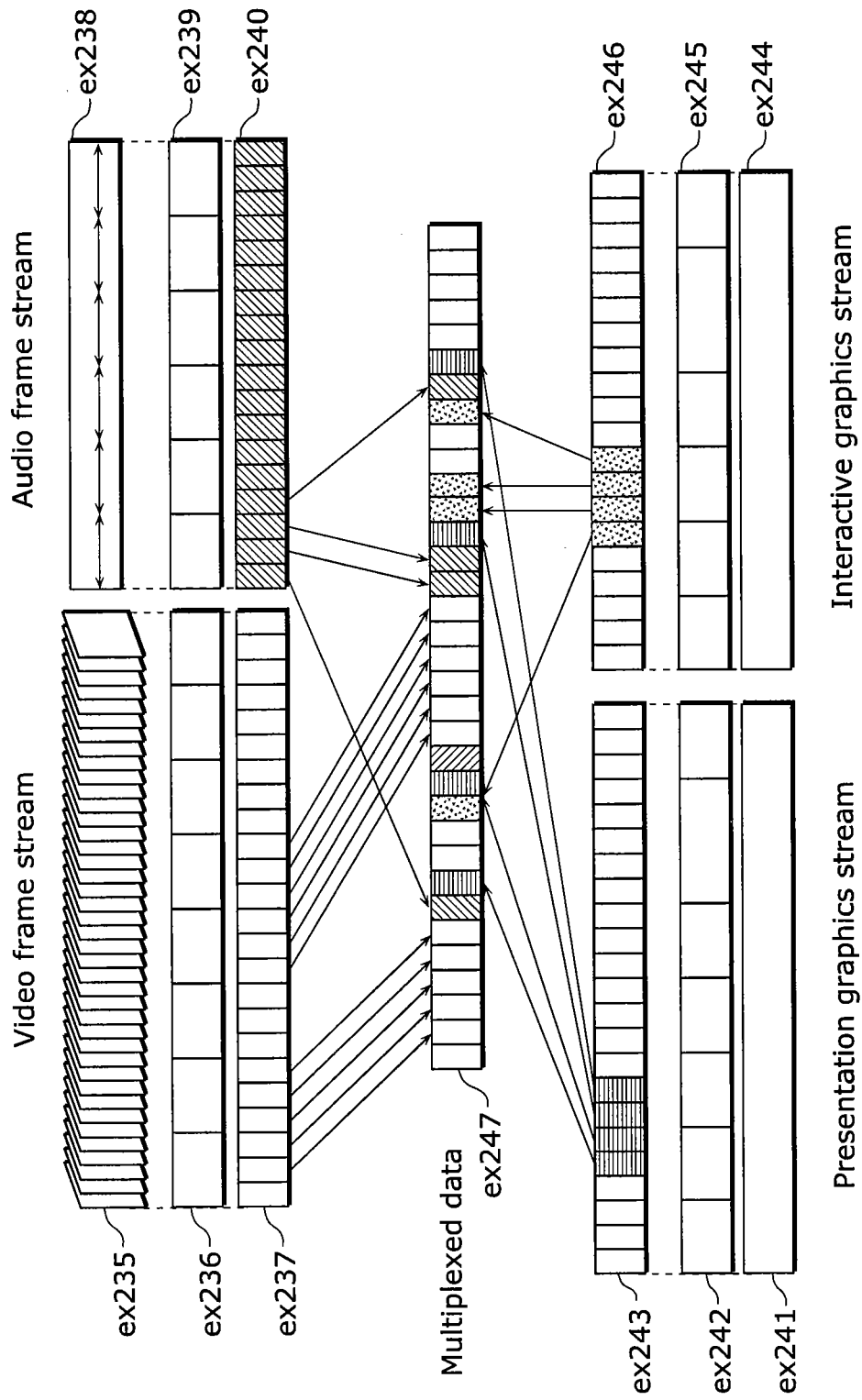
FIG. 24 schematically shows how each stream is multiplexed in multiplexed data.

FIG. 24 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 25:
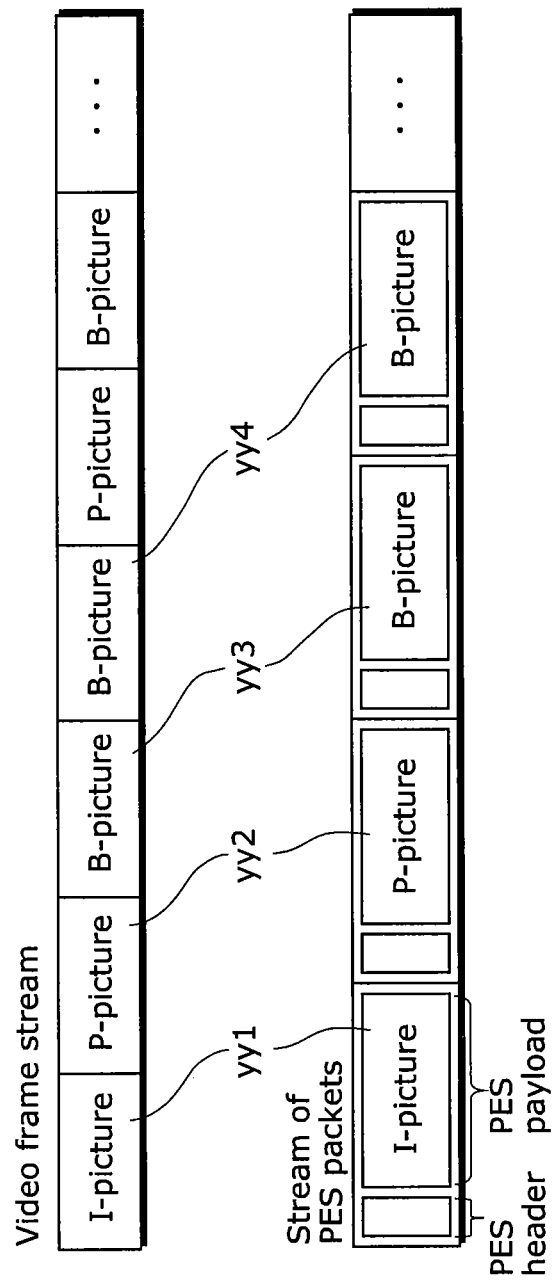
FIG. 25 shows how a video stream is stored in a stream of PES packets in more detail.

FIG. 25 illustrates how a video stream is stored in a stream of PES packets in more detail. The first bar in FIG. 25 shows a video frame stream in a video stream. The second bar shows the stream of PES packets. As indicated by arrows denoted as yy1, yy2, yy3, and yy4 in FIG. 25, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 26:
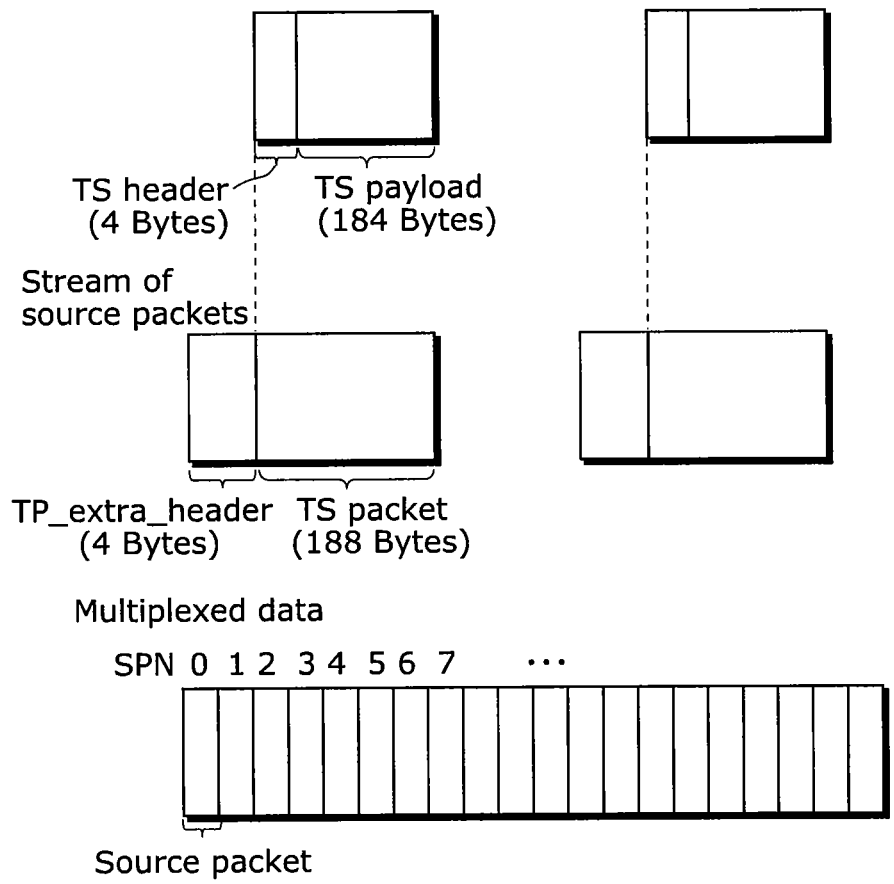
FIG. 26 shows a structure of TS packets and source packets in the multiplexed data.

FIG. 26 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 26. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 27:
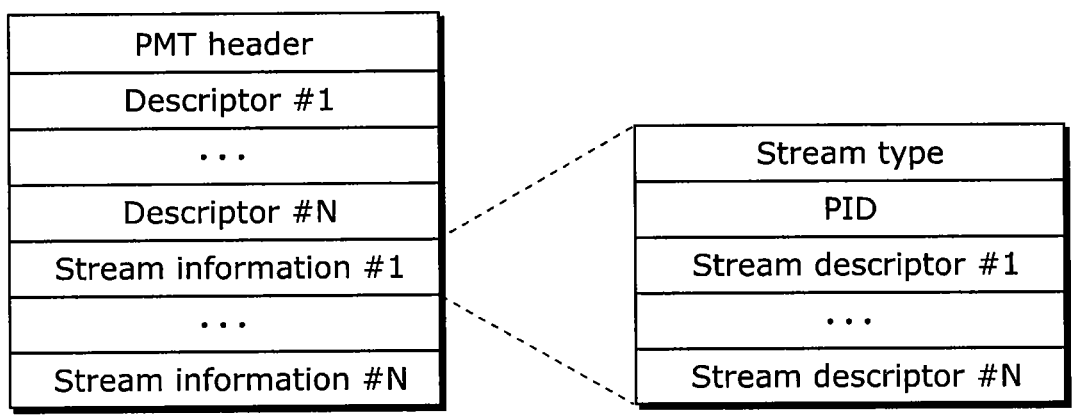
FIG. 27 shows a data structure of a PMT.

FIG. 27 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 28:
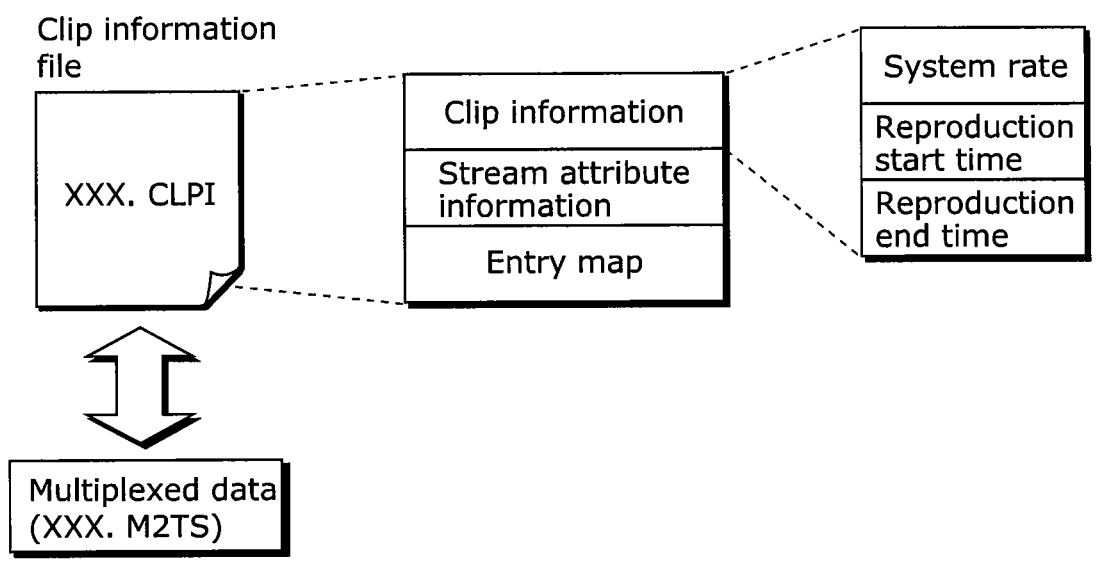
FIG. 28 shows an internal structure of multiplexed data information.

Each of the multiplexed data information files is management information of the multiplexed data as shown in FIG. 28. The multiplexed data information files are in one to one correspondence with the multiplexed data, and each of the files includes multiplexed data information, stream attribute information, and an entry map.

As illustrated in FIG. 28, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 29:
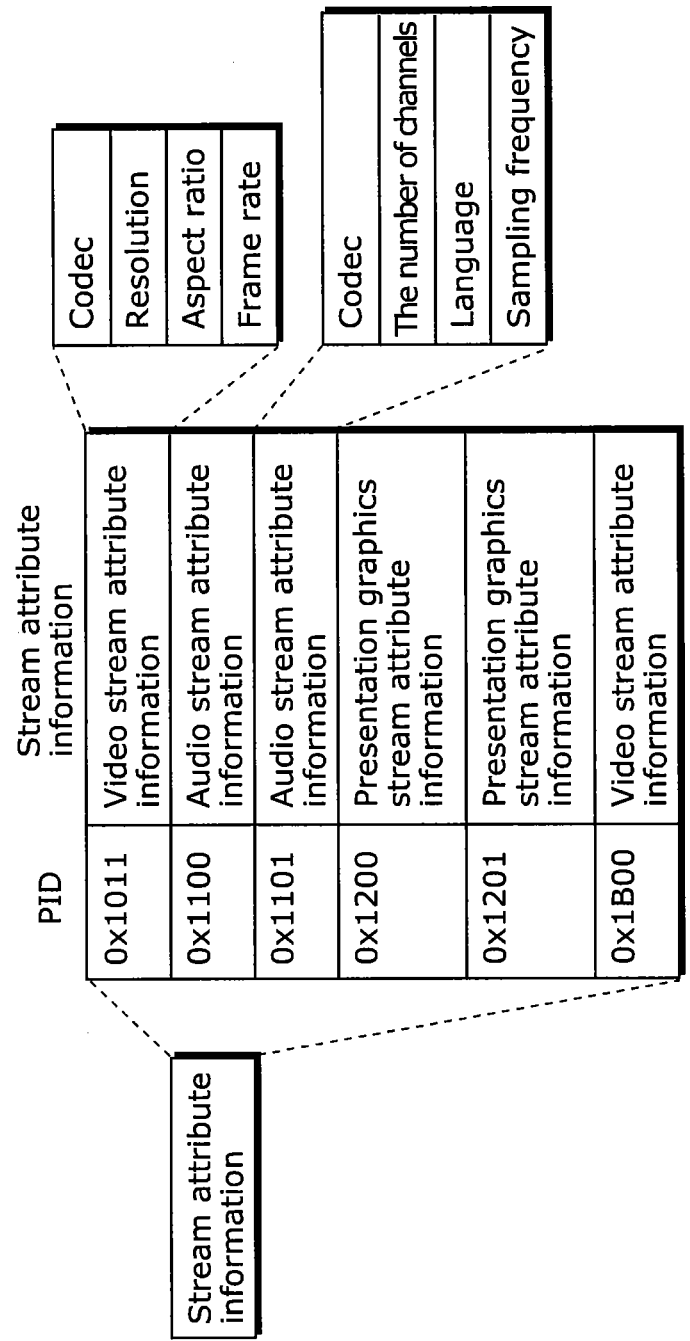
FIG. 29 shows an internal structure of stream attribute information.

As shown in FIG. 29, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 30:
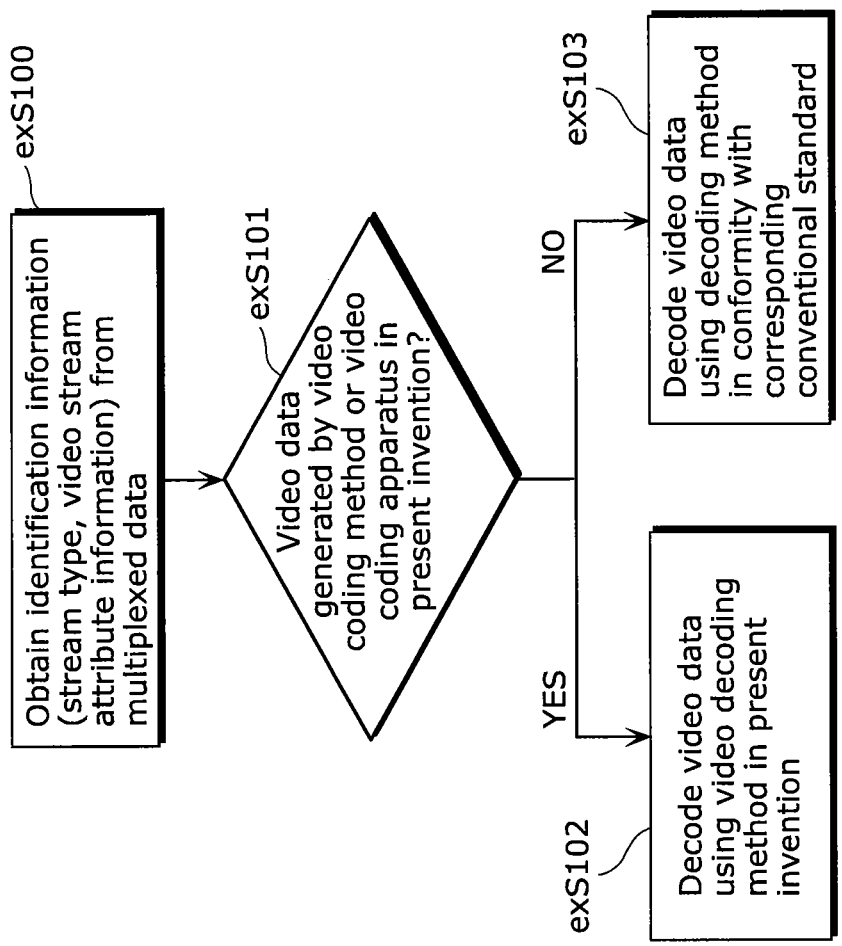
FIG. 30 shows steps for identifying video data.

Furthermore, FIG. 30 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 5

Figure 31:
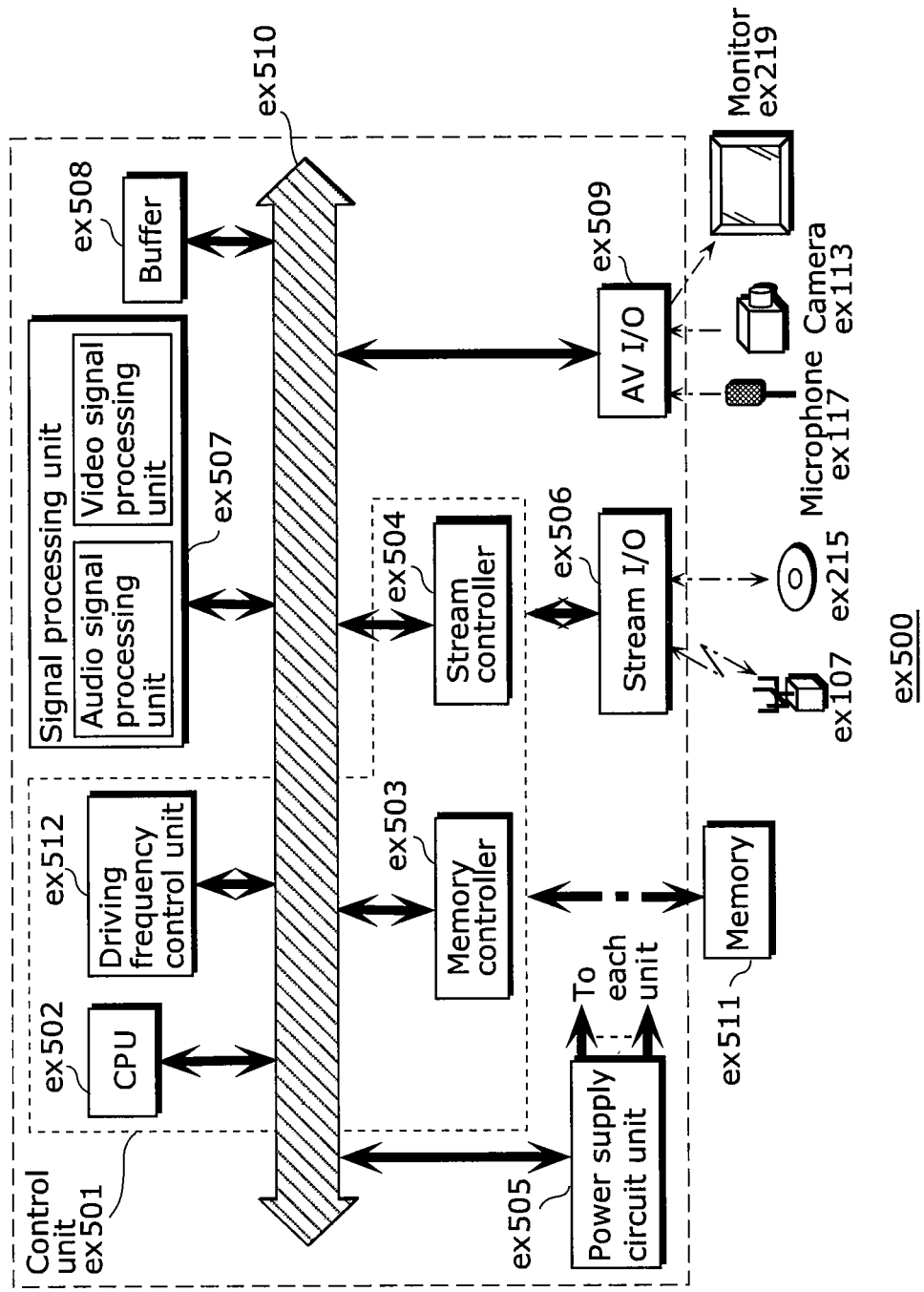
FIG. 31 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 31 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 6

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 32:
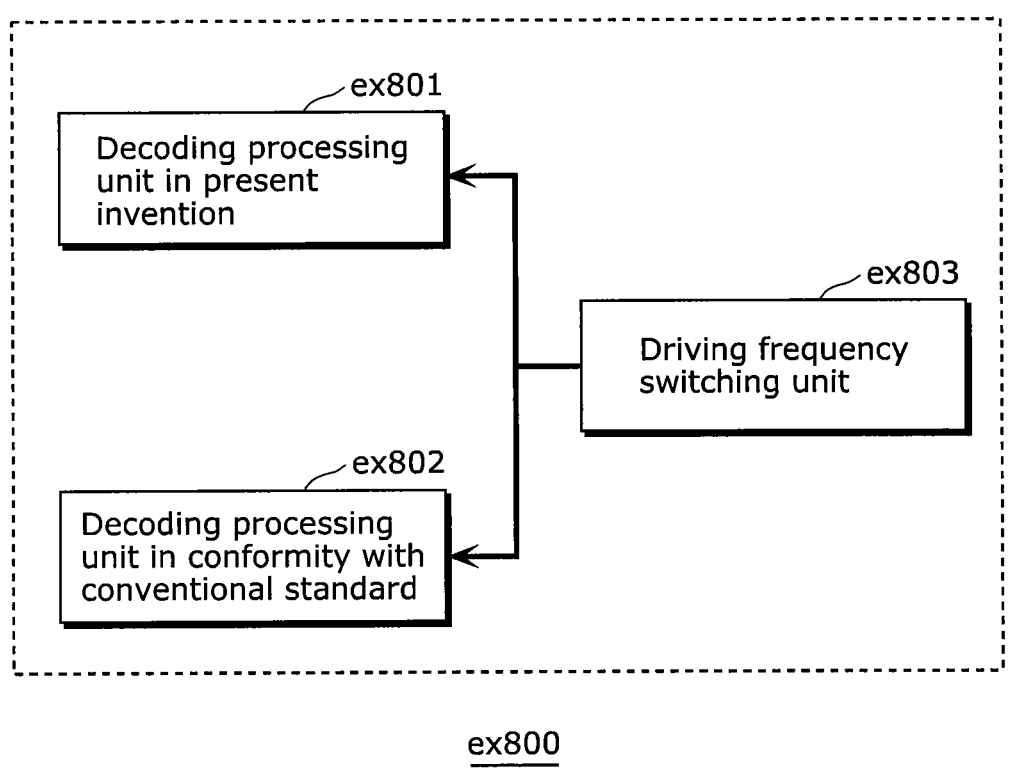
FIG. 32 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 32 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 31. Here, each of the decoding processing unit ex801 that executes the moving picture decoding method described in each of embodiments and the decoding processing unit ex802 that conforms to the conventional standard corresponds to the signal processing unit ex507 in FIG. 31. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment B is probably used for identifying the video data. The identification information is not limited to the one described in Embodiment B but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 34. The driving frequency can be selected by storing the look-up table in the buffer ex508 and in an internal memory of an LSI, and with reference to the look-up table by the CPU ex502.

Figure 33:
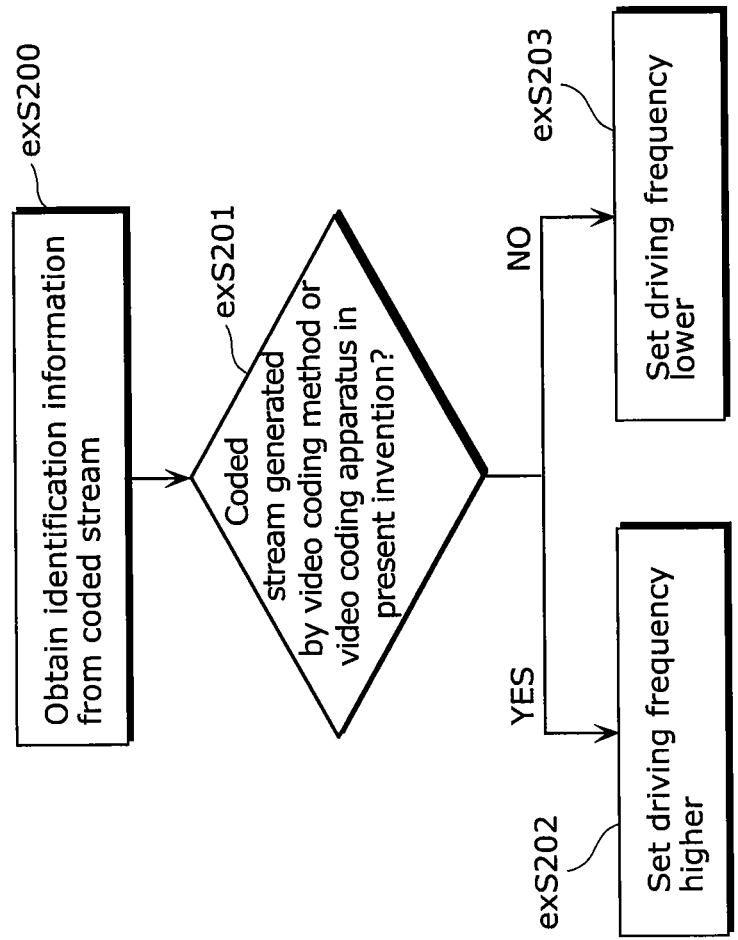
FIG. 33 shows steps for identifying video data and switching between driving frequencies.

FIG. 33 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 35A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 35B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

INDUSTRIAL APPLICABILITY

The image coding apparatus and the image decoding apparatus according to an aspect of the present invention can be used for, for example, a television, a digital video recorder, a car navigation system, a mobile phone, a digital camera, and a digital video camera.

REFERENCE SIGNS LIST 100, 100A Image coding apparatus
101 MVC encoder
102, 102A Down-converter
103, 103A Subtractor
111, 111A First encoder
112, 112A Second encoder
113 Multiplexer
115 Output unit
151 Shift amount determining unit
152, 153, 252, 255 Bit shifter
154, 155, 253 Operator
200, 200A Image decoding apparatus
201 MVC decoder
202, 202A Adder
211, 211A First decoder
212, 212A Second decoder
213 Multiplexer
251 Shift amount obtaining unit
254 Adder
D11, D23, D32, D32A, D54, D54A Base layer picture
D12, D24 Non-base layer picture
D13, D33, D33A Reconstructed picture
D14, D21 Base view bitstream
D15, D22 Non-base view bitstream
D16, D35, D35A MVC bitstream
D25, D53, D53A Picture sequence
D31, D56 10-bit picture
D31A 12-bit picture
D34, D34A, D55, D55A Enhancement layer picture
D36, D51, D51A Base layer bitstream
D37, D52, D52A Enhancement layer bitstream
D56A Target picture

The invention claimed is:

1. An image coding apparatus which codes a target picture having a bit-depth higher than a predetermined bit-depth, the bit-depth indicating an information capacity per pixel, the image coding apparatus comprising:
   a down-converter which generates a base layer picture by performing down-conversion on the target picture to reduce the bit-depth of the target picture by a first value so that the bit-depth of the target picture equals the predetermined bit-depth;
   a first encoder which codes the base layer picture, and generates a reconstructed picture by decoding the coded base layer picture;
   a subtractor which includes a shift amount determining unit configured to determine a second value based on characteristics of the base layer picture, the target picture, or the reconstructed picture, wherein the subtractor performs shift amount adjustment on the reconstructed picture to increase a bit-depth of the reconstructed picture by the second value, and generates, based on the reconstructed picture on which the shift amount adjustment has been performed and the target picture, an enhancement layer picture which is a picture for enhancing a quality of the base layer picture and has a same bit-depth as a bit-depth of the base layer picture;
   a second encoder which codes the enhancement layer picture; and
   a generating unit which generates the coded base layer picture, the coded enhancement layer picture, and a value corresponding to the second value determined by the shift amount determining unit.

2. The image coding apparatus according to claim 1,
wherein the subtractor (i) subtracts, from each of pixel values of pixels included in a picture having a bit-depth obtained by reducing the bit-depth of the target picture by a third value, a pixel value of a corresponding one of pixels included in the reconstructed picture on which the shift amount adjustment has been performed, and (ii) generates the enhancement layer picture using, out of bit information indicating a result of the subtraction, bit information included in a range of the predetermined bit-depth from a lower bit, the third value being a difference between the first value and the second value.

3. The image coding apparatus according to claim 1,
wherein the shift amount determining unit is configured to determine the second value such that the second value increases when low frequency components among spatial-frequency components of the target picture or the base layer picture are visually more dominant.

4. The image coding apparatus according to claim 1,
wherein the generating unit is further configured as a multiplexer which generates a bitstream conforming to a multiview video coding (MVC) standard, by multiplexing a base layer bitstream which includes the coded base layer picture and an enhancement layer bitstream which includes the coded enhancement layer picture,
the first encoder, the second encoder, and the multiplexer are configured as an MVC encoder, and
the multiplexer adds the value corresponding to the second value to the bitstream conforming to the MVC standard, the value corresponding to the second value being determined for a plurality of target pictures including the target picture.

5. An image coding apparatus which codes a target picture having a bit-depth higher than a predetermined bit-depth, the bit-depth indicating an information capacity per pixel, the image coding apparatus comprising:
a down-converter which generates a base layer picture by performing down-conversion on the target picture to reduce the bit-depth of the target picture by the first value so that the bit-depth of the target picture equals the predetermined bit-depth, wherein the down-conversion is performed by shifting down, by a first value, a bit sequence of each of pixel values of pixels included in the target picture;
a first encoder which codes the base layer picture, and generates a reconstructed picture by decoding the coded base layer picture;
a subtractor which
(i) shifts up, by a second value, a bit sequence of each of pixel values of pixels included in the reconstructed picture, to increase a bit-depth of the reconstructed picture by the second value,
(ii) shifts down, by a difference between the first value and the second value, the bit sequence of each of the pixel values of the pixels included in the target picture, and
(iii) generates an enhancement layer picture from a difference between each of the shifted-down pixel values of the pixels included in the target picture and the shifted-up pixel value of a corresponding one of the pixels included in the reconstructed picture, the generated enhancement layer picture being a picture for enhancing a quality of the base layer picture and has a same bit-depth as a bit-depth of the base layer picture;
a second encoder which codes the enhancement layer picture; and
a generating unit which generates the coded base layer picture and the coded enhancement layer picture.

6. An image coding apparatus which codes a target picture having a bit-depth higher than a predetermined bit-depth, the bit-depth indicating an information capacity per pixel, the image coding apparatus comprising:
a down-converter which generates a base layer picture by performing down-conversion to divide, by a predetermined divisor, each of pixel values of pixels included in the target picture so that the bit-depth of the target picture is reduced by a first value;
a first encoder which codes the base layer picture, and generates a reconstructed picture by decoding the coded base layer picture;
a subtractor which
(i) multiplies, by a predetermined multiplier, each of pixel values of pixels included in the reconstructed picture so that a bit-depth of the reconstructed picture increases by a second value,
(ii) divides, by a predetermined divisor, each of the pixel values of the pixels included in the target picture so that the bit-depth of the target picture is reduced by a difference between the first value and the second value, and
(iii) generates an enhancement layer picture from a difference between each of the pixel values, which is obtained from the division, of the pixels included in the target picture and the pixel value, which is obtained from the multiplication, of a corresponding one of the pixels included in the reconstructed picture, the generated enhancement layer picture being a picture for enhancing a quality of the base layer picture and has a same bit-depth as a bit-depth of the base layer picture;
a second encoder which codes the enhancement layer picture; and
a generating unit which generates the coded base layer picture and the coded enhancement layer, picture.

7. The image coding apparatus according to claim 2,
wherein the subtractor adds a predetermined value to a value obtained by subtracting, from each of pixel values of pixels included in the target picture having the bit-depth reduced by the third value, a pixel value of a corresponding one of the pixels included in the reconstructed picture on which the shift amount adjustment has been performed, the predetermined value being a value that makes each of pixel values of pixels included in the enhancement layer picture a positive value.

8. An image decoding apparatus which decodes a picture from a bitstream to generate a target picture having a bit-depth higher than a predetermined bit-depth by a first value, the bit-depth indicating an information capacity per pixel, the image decoding apparatus comprising:
a first decoder which decodes from the bitstream a base layer picture having a bit-depth equal to the predetermined bit-depth;
a second decoder which decodes from the bitstream an enhancement layer picture having a bit-depth equal to the predetermined bit-depth; and
an adder which generates the target picture by adding up the base layer picture and the enhancement layer picture based on a second value obtained from the bitstream,
wherein the adder generates the target picture by (i) performing up-conversion on the base layer picture to increase the bit-depth of the base layer picture by the second value, (ii) generating a synthesized picture of the base layer picture on which the up-conversion has been performed and the enhancement layer picture, by adding up each of pixel values of pixels of the base layer picture and a pixel value of a corresponding one of pixels of the enhancement layer picture, and (iii) increasing a bit-depth of the synthesized picture by a third value that is a difference between the first value and the second value.

9. The image decoding apparatus according to claim 8, wherein the bitstream is a bitstream conforming to a multiview video coding (MVC) standard, the image decoding apparatus further comprising a multiplexer which generates a picture sequence by multiplexing the decoded base layer picture and the decoded enhancement layer picture, wherein the first decoder, the second decoder, and the multiplexer are configured as an MVC decoder, and the adder obtains the second value from the bitstream conforming to the MVC standard.

10. The image decoding apparatus according to claim 8, wherein the adder generates the target picture by (i) shifting up, by the second value, a bit sequence of each of the pixel values of the pixels included in the base layer picture, and (ii) shifting up, by the third value, a bit sequence of each of pixel values of pixels included in the synthesized picture.

11. The image decoding apparatus according to claim 8, wherein the adder generates the target picture by (i) multiplying, by a predetermined multiplier, each of the pixel values of the pixels included in the base layer picture so that the bit-depth of the base layer picture increases by the second value, and (ii) multiplying, by a predetermined multiplier, each of pixel values of pixels included in the synthesized picture so that the bit-depth of the synthesized picture increases by the third value.

12. An image decoding apparatus which decodes a picture from a bitstream to generate a target picture having a bit-depth higher than a predetermined bit-depth by a first value, the bit-depth indicating an information capacity per pixel, the image decoding apparatus comprising:

a first decoder which decodes from the bitstream a base layer picture having a bit-depth equal to the predetermined bit-depth;

a second decoder which decodes from the bitstream an enhancement layer picture having a bit-depth equal to the predetermined bit-depth; and an adder which generates the target picture by adding up the base layer picture and the enhancement layer picture based on a second value obtained from the bitstream, wherein, before adding the base layer picture and the enhancement layer picture, the adder subtracts, from each of pixel values of pixels included in the enhancement layer picture, a predetermined value added at a time of coding.

13. An image coding method for coding a target picture having a bit-depth higher than a predetermined bit-depth, the bit-depth indicating an information capacity per pixel, the image coding method comprising:

generating a base layer picture by performing down-conversion on the target picture to reduce the bit-depth of the target picture by a first value so that the bit-depth of the target picture equals the predetermined bit-depth;

coding the base layer picture, and generating a reconstructed picture by decoding the coded base layer picture;

determining a second value based on characteristics of the base layer picture, the target picture, or the reconstructed picture;

performing shift amount adjustment on the reconstructed picture to increase a bit-depth of the reconstructed picture by the second value, and generating, based on the reconstructed picture on which the shift amount adjustment has been performed and the target picture, an enhancement layer picture which is a picture for enhancing a quality of the base layer picture and has a same bit-depth as a bit-depth of the base layer picture;

coding the enhancement layer picture to generate the coded base layer picture, the coded enhancement layer picture, and a value corresponding to the second value determined by the shift amount determining unit.

14. A non-transitory computer-readable recording medium for use in a computer, the recording medium having a computer program recorded thereon for causing the computer to execute the image coding method according to claim 13.

15. An image decoding method for decoding a picture from a bitstream to generate a target picture having a bit-depth higher than a predetermined bit-depth by a first value, the bit-depth indicating an information capacity per pixel, the image decoding method comprising:

decoding from the bitstream a base layer picture having a bit-depth equal to the predetermined bit-depth;

decoding from the bitstream an enhancement layer picture having a bit-depth equal to the predetermined bit-depth; and generating the target picture by adding up the base layer picture and the enhancement layer picture based on a second value obtained from the bitstream, wherein the target picture is generated by (i) performing up-conversion on the base layer picture to increase the bit-depth of the base layer picture by the second value, (ii) generating a synthesized picture of the base layer picture on which the up-conversion has been performed and the enhancement layer picture, by adding up each of pixel values of pixels of the base layer picture and a pixel value of a corresponding one of pixels of the enhancement layer picture, and (iii) increasing a bit-depth of the synthesized picture by a third value that is a difference between the first value and the second value.

16. A non-transitory computer-readable recording medium for use in a computer, the recording medium having a computer program recorded thereon for causing the computer to execute the image decoding method according to claim 15.

* * * * *